US008239230B2

(12) United States Patent
Kothari

(10) Patent No.: US 8,239,230 B2
(45) Date of Patent: Aug. 7, 2012

(54) SYSTEM AND METHOD FOR MANAGING PERSONNEL AND RESOURCES IN GAMING ESTABLISHMENT

(75) Inventor: Pranav S. Kothari, Missouri City, TX (US)

(73) Assignee: Casta International, LLC, Houston, TX (US)

(*) Notice: Subject to any disclaimer, the term of this patent is extended or adjusted under 35 U.S.C. 154(b) by 1002 days.

(21) Appl. No.: 12/150,546

(22) Filed: Apr. 28, 2008

(65) Prior Publication Data
US 2009/0098941 A1   Apr. 16, 2009

Related U.S. Application Data

(60) Provisional application No. 60/926,591, filed on Apr. 26, 2007.

(51) Int. Cl.
*G06Q 10/00* (2006.01)
(52) U.S. Cl. .................. 705/7.12; 705/7.22; 715/961
(58) Field of Classification Search .................. None
See application file for complete search history.

(56) References Cited

U.S. PATENT DOCUMENTS

| | | | | |
|---|---|---|---|---|
| 2005/0004828 | A1* | 1/2005 | deSilva et al. | 705/9 |
| 2006/0252530 | A1* | 11/2006 | Oberberger et al. | 463/29 |
| 2006/0258427 | A1* | 11/2006 | Rowe et al. | 463/16 |
| 2007/0265064 | A1* | 11/2007 | Kessman et al. | 463/25 |

OTHER PUBLICATIONS

Bernie N Fried, Jim Kilby, How to staff table games in the casino. The Bottom Line. Austin: Aug./Sep. 1998. vol. 13, Iss. 5; p. 10, 4 pgs.*
Cohan, Joy. Casino hits jackpot with employee scheduling software. Personnel Journal. Santa Monica: May 1993. p. 8, 1 pg.*
Casino Experiences Efficiencies With Ultimate Software's UltiPro After Switching From Service Bureau. PR Newswire. New York: Jul. 12, 2005. p. 1.*

* cited by examiner

*Primary Examiner* — Lynda Jasmin
*Assistant Examiner* — Timothy Padot
(74) *Attorney, Agent, or Firm* — Leason Ellis LLP

(57) ABSTRACT

Personnel and resources are managed in a gaming establishment. A user interface is provided that includes an employee module, a shift-scheduling module, a pit defining module, a table defining module, and a game defining module. A scheduling module is provided that a scheduling module programmed and configured to assign a shift that represents a period of time when a plurality of employees are at work, is further programmed and configured to define whether a table is open or closed in a respective area, and is still further operable to automatically assign an employee to the table based at least on the employee's proficiency with regard to a respective game played at the table and the employee's availability during the shift, wherein the assigning occurs as a function of the electronic game information, the electronic pit information, the electronic shift information and the electronic employee information, respectively.

20 Claims, 41 Drawing Sheets

REPLACEMENT SHEET

400

| SCHEDULE | REPORTS | SETUP | TOOLS | | HOME | LOGOUT |
| | | | | | OPTION | HELP |

Home/ Employee Default

Employee Setup

You can add new employees, edit existing employees or list the employees to see their details. You can also import employees from a CSV file.

Add Employee
- Add New Employee

Employee List — 402
- Employee List

Import Employee — 404
- Import Employees

Employee Summary

| | |
|---|---|
| Total Employee | 510 |
| Part Time | 452 |
| Full Time | 58 |
| On-Call | 0 |
| Active | 510 |
| Inactive | 0 |

[Back]

Fig. 17 of CASTA Solutions, LLC. All rights reserved. Terms of Use

Employee List

Home/ Employee Default/ List Employee

To edit employee information, click on Edit icon.

Legend
WWH: Weekly work hours

Employee Level: [Dealer ▼]   Employee Name: [_____] [Go]

Employee Related Links ▶

Results 1-23 of 362
Result Page: 1 | 2 | 3 | >

| Employee ID | Name | Phone | E-mail | Position Type | WWH | Edit |
|---|---|---|---|---|---|---|
| 200124 | Abbott, Reece | | tester1@redcouchinteractive.co | Part Time | 30 | ✎ |
| 200179 | Acosta, Elisabeth | | tester1@redcouchinteractive.co | Part Time | 30 | ✎ |
| 200156 | Allison, Destiney | | tester1@redcouchinteractive.co | Part Time | 30 | ✎ |
| 200087 | Alvarado, Marcos | | tester1@redcouchinteractive.co | Part Time | 30 | ✎ |
| 100099 | Alvarez, Benny | | tester1@redcouchinteractive.co | Part Time | 40 | ✎ |
| 200188 | Anthony, Elsa | | tester1@redcouchinteractive.co | Part Time | 30 | ✎ |
| 300079 | Ashley, Jamie | | tester1@redcouchinteractive.co | Full Time | 40 | ✎ |
| 200161 | Atkins, Devyn | | tester1@redcouchinteractive.co | Part Time | 30 | ✎ |
| 200230 | Atkinson, Kaylyn | | tester1@redcouchinteractive.co | Part Time | 30 | ✎ |
| 200173 | Ayala, Eileen | | tester1@redcouchinteractive.co | Part Time | 30 | ✎ |
| 300033 | Ayers, Christine | | tester1@redcouchinteractive.co | Part Time | 30 | ✎ |
| 100071 | Bailey, Barryon | | tester1@redcouchinteractive.co | Part Time | 40 | ✎ |

Shift

Active Shift

To edit Shift Information, click on Edit Icon.

| Shift ID (Name) | Start Time | End Time | Actions |
|---|---|---|---|
| Day | 01:00:04 | 07:00:00 | 📝 |
| 201 | 07:04:04 | 14:00:00 | 📝 |
| 202 | 14:00:04 | 20:00:00 | 📝 |
| 203 | 02:00:04 | 04:00:00 | 📝 |
| 204 | 06:00:04 | 07:00:00 | 📝 |
| 200 | 12:00:04 | 14:00:00 | 📝 |
| 201 | 14:00:04 | 16:00:00 | 📝 |
| 202 | 16:00:04 | 18:00:00 | 📝 |

Fig. 23

Schedule

Home/Schedule/Default Schedule View/Dealer Weekly Schedule

Dealer weekly schedule

Dealer weekly schedule for (04/05/2007 - 04/22/2007)

| Employee | Sun | Mon | Tue | Wed | Thu | Fri | Sat |
|---|---|---|---|---|---|---|---|
| Robetts,Patty | | 02:00/04:00 17<br>07:00/14:00 31<br>01:00/07:00 65 | | | | | |
| Thompson,J | 01:00/07:00 18 | 07:00/14:00 5<br>01:00/07:00 87<br>02:00/04:00 9 | | | | | |
| Buchanan,Gerald | 01:00/07:00 10 | 07:00/14:00 11<br>01:00/07:00 20<br>02:00/04:00 33 | | | | | |
| Hutchinson,Paul | 01:00/07:00 20 | 07:00/14:00 17<br>02:00/04:00 29<br>01:00/07:00 23 | | | | | |
| Binion,Maggie | | 07:00/14:00 12<br>02:00/04:00 65<br>01:00/07:00 | | | | | |

SYSTEM AND METHOD FOR MANAGING PERSONNEL AND RESOURCES IN GAMING ESTABLISHMENT

CROSS-REFERENCE TO RELATED APPLICATION

This application is based on and claims priority to U.S. Provisional Patent Application Ser. No. 60/926,591, filed on Apr. 26, 2007 and entitled SYSTEM AND METHOD FOR MANAGING PERSONNEL AND RESOURCES IN GAMING ESTABLISHMENT, the entire contents of which are hereby incorporated by reference.

BACKGROUND OF THE INVENTION

1. Field of the Invention

The present invention relates, generally, to human resource management, and, more particularly, to a system and method for managing space and personnel in dynamic physical surroundings.

2. Description of the Related Art

Managing personnel, physical space and other resources, and particularly in gaming establishments such as casinos, has been a source of frustration for operators and owners. In a typical casino, an area commonly referred to as a "pit" has gaming tables, such as for various card games, dice games, roulette or other games, many for gambling.

In a typical casino, floor supervisors or pit bosses manage the gaming floor area. They usually designate one individual, known as a "roadmap administrator" to maintain the real-time status of the gaming floor. For example, a roadmap administrator, assign dealers to specific tables, open and close pits and games, manage strings, as well as EO/CO employees as it happens on the gaming floor. Other tasks assigned to roadmap administrators include activating and deactivating tables, communicating floor status to other managers, and keeping track of overall floor resources. In some cases, such tasks are assigned to lower paid employees, such as schedulers, other administrators or other employees. Thus, there may be overlap with respect to tasks associated with employees of a gaming establishment.

Some gambling tables or areas in a casino are particularly desired by employees because such tables are populated by gamblers who are generous with their tips, or the tables/areas are otherwise potentially lucrative. In some cases, favoritism within casino employees excludes otherwise competent dealers or other employees from working those locations within a casino. Unfortunately, it is not uncommon for pit bosses to receive a pay-off from dealers in order for the pit bosses to ensure that the dealers are reassigned to a particular table/area. (this seems very odd to put in here as it does not hold true for all places. More so, favoritism exists in such cases as a Roadmap Administrator may choose to give a dealer preferential tables, more EO as well as a better games dealt ranking.

Other tasks associated with roadmap administrators or other managerial parties include managing requests for private time off, early-outs and call-outs. Private time off regards time, for example, weekly day(s) off, when personnel are paid but not at work. Early-outs regard an employee's early dismissal from a workday, and may be granted in case, for example, a casino is not very busy or not populated with clients. Call-outs refer to times when employees telephone or otherwise contact a roadmap administrator or another manager and request an ad-hoc day off. In some cases, employees, such as dealers, amass points when private time off, early-outs or call-outs are granted. For example, one employee may have five early-out points, and another has only one. In case both employees request early out, the employee with only one point is typically awarded early out. Other scheduling issues regard holidays and other days when a plurality of employees request to be absent. Maintaining sufficient levels of personnel is particularly important in a casino environment, and maintaining sufficient employment levels typically depends upon a particular day and time. For example, Friday night is typically a much more busy time in a casino than a Tuesday morning, thus requiring higher employment levels.

Human resource executives and managers find it problematic to set up shift details, evaluate and update a dealer's status, as well as to keep track of employee turnover, in real time. It would be desirable for a casino or other gaming establishment to employ technology that enables improved data management and human resource management.

Unfortunately, many casinos do not have technology capable of addressing the personnel and resources, management issues, such as described above. Instead, it is not uncommon, for example, for a roadmap administrator to carry a simple pad and pencil to execute tasks on the casino floor. Accordingly, roadmap administrators are sometimes referred to as "pencils." After dealers and employees have been assigned to tables, for example, the pit boss hands his handwritten notes to data entry personnel who enter the data into a human resource software application.

SUMMARY

Accordingly, the present invention comprises a system and method for managing personnel and resources in a gaming establishment. In a preferred embodiment, an information processor is provided that is operable to communicate over a communication network. A database is further provided that is accessible by the information processor and operable to store information.

Continuing with this embodiment, a user interface is further provided by the information processor and is accessible over the communication network. Moreover, an employee module is provided in the user interface that is operable to receive electronic employee information representing an employee. The electronic employee information is preferably stored in the database.

Additionally, a shift-scheduling module is provided in the user interface. The shift-scheduling interface is preferably operable to receive electronic shift information that defines a shift, including a period of time when an employee of the gaming establishment works. The electronic shift information is further stored in the database.

Additionally, a pit defining module is preferably provided in the user interface that is operable to receive electronic pit information representing an area in the gaming establishment. The pit defining module also operates to store the electronic pit information in the database. Additionally, a table defining module is preferably provided in the user interface and that is operable to receive electronic table information representing a table assigned to the area in the gaming establishment. Moreover, a game defining module is preferably provided in the user interface and that is operable to receive electronic game information representing a game provided for play at the gaming establishment, and that is further operable to store the electronic game information in the database.

Moreover, a scheduling module is preferably provided in the user interface and is operable to assign a game to a respective area. The scheduling module is further operable to assign a table in a respective area, and is further operable to assign a shift to the game and is still further operable to assign an employee to the shift. The various assignments occur as a function of the electronic game information, the electronic pit information, the electronic shift information and the electronic employee information, respectively. Preferably, the scheduling module is further operable to reassign one of a different game, a different area, a different shift and a different employee to a user selection made in the user interface, and further wherein at least one of the electronic employee information, the electronic shift information, the electronic pit information, the electronic table information and the electronic game information is received from a user or is imported from an external data source, such as a database or a spreadsheet.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form of the invention, which is presently preferred, it being understood, however, that the invention is not limited to the precise arrangements and instrumentalities shown. The features and advantages of the present invention will become apparent from the following description of the invention that refers to the accompanying drawings, in which:

FIGS. 16-27J illustrates example display screens that are provided to a user in connection with a preferred embodiment of the present invention.

DETAILED DESCRIPTION OF EMBODIMENTS OF THE INVENTION

The present invention provides an innovative and powerful system and method for managing personnel and resources, for example, in a casino environment. The invention improves upon prior art management applications by reducing time and increasing accuracy in connection with managing commercial establishments such as gaming establishments. Further, the teachings herein provide improved quality control, particularly with respect to individuals, and reduce or eliminate, for example, favoritism. A convenient and intuitive user interface is provided for scheduling and managing people and resources, for example, in a casino, and reduces costs associated therewith.

In a preferred embodiment, drag-and-drop functionality is supported in a web-based user interface that enables roadmap administrators and schedulers to assign tables to various pits within a casino, as well as to assign and/or substitute assigned personnel to tables or areas in a gaming establishment. As shown and described herein, users can make selections in display screens to conveniently move dealers to various tables, remove existing dealers from a table, or open/close a table.

Figure 1:
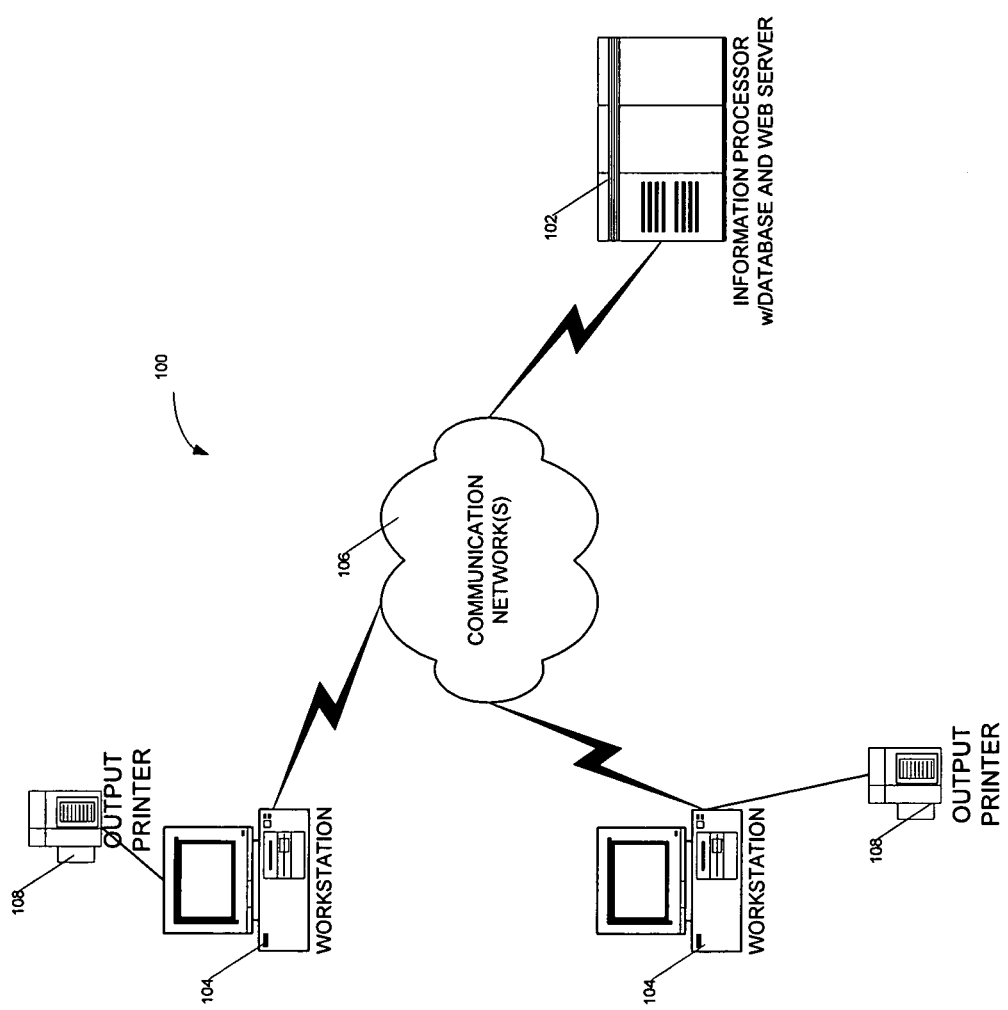
FIG. 1 illustrates an example hardware arrangement according to a preferred embodiment of the present invention.

Referring to the drawings, in which like reference numerals refer to like elements, FIG. 1 illustrates an example hardware arrangement according to a first embodiment, and referred to herein, generally, as system 100. In the embodiment shown in FIG. 1, system 100 includes at least one information processor 102 and one or more workstations 104. Information processor 102 is preferably configured to operate as an internet web server and is further operable to access and update a database. Information processor 102 accesses communication network 106 and communicates with workstations 104, such that workstations 104 are operable to transmit and receive data there-between. Communication network 106 can be any network, and is preferably the internet. Preferably, workstations 104 and information processor 102 communicate via the known communications protocol, Transmission Control Protocol/Internet Protocol ("TCP/IP"). Also and as illustrated in FIG. 1, some of the workstations 104 are configured with output printers 108, as known in the art.

In a preferred embodiment, a workstation 104 is configured with web browser software application, which operates to access data entry display screens from information processor 102. In this way, workstation 104 implements many of the features described herein over a communication session on network 106. Thus, workstation 104 is typically "on-line" when the application software described herein operates.

Information processor 102 and workstations 104 are preferably any devices that are capable of sending and receiving data across communication network 106, e.g., mainframe computers, mini computers, personal computers, laptop computers, a personal digital assistants (PDA) and internet access devices such as Web TV. In addition, information processor 102 and workstations 104 are preferably equipped with a web browser, such as MICROSOFT INTERNET EXPLORER, NETSCAPE NAVIGATOR, MOZILLA FIREFOX or the like. Thus, as envisioned herein, information processor 102 and/or workstations 104 are devices that can communicate over a network and can be operated anywhere.

The nature of the present invention is such that one skilled in the art of writing computer executable code (i.e., software) can implement the described functions using one or more of a combination of popular computer programming languages and developing environments including, but not limited to C, C++, Visual Basic, JAVA, PHP, HTML, XML, ACTIVE SERVER PAGES, JAVA servlets, MICROSOFT .NET, C#, ASP.NET, and a plurality of various development applications.

For example, data may be configured in a MICROSOFT EXCEL spreadsheet file, a comma delimited ASCII text file, a MICROSOFT SQL SERVER compatible table file (e.g., MS-ACCESS table), or the like. In another embodiment, data may be formatted as an image file (e.g., TIFF, JPG, BMP, GIF, or the like). In yet another embodiment, data may be stored in an ADOBE ACROBAT PDF file. Preferably, one or more data formatting and/or normalization routines are provided that manage data received from one or a plurality of sources. In another example, data are received that are provided in a particular format (e.g., MICROSOFT EXCEL), and programming routines are executed that convert the data to another formatted (e.g., ASCII comma-delimited text).

Furthermore, data entered, imported, and/or stored in accordance with the teachings herein can be exported to one or more formats for third-party software applications. For example, data can be imported to or exported from a computer software program, such as in a time and attendance software application. In this way, various functionality provided by other software programs can be provided using data originating from information processor 102 and/or workstations 104.

It is contemplated herein that any suitable operating system can be used on workstations 104 and information processor 102, for example, DOS, WINDOWS 3.x, WINDOWS 95, WINDOWS 98, WINDOWS NT, WINDOWS 2000, WINDOWS XP, WINDOWS VISTA, WINDOWS CE, WINDOWS POCKET PC, MAC OS, UNIX, LINUX, PALM OS, POCKET PC or any other suitable operating system. Of course, one skilled in the art will recognize that other operating systems are or will be available.

Although the teachings herein are described by way of example and in terms of a web-based system, system 100 is not limited to the above configuration. It is contemplated that system 100 can be arranged such that workstations 104 communicate with and display data received from information processor 102 using any known communication and display method, for example, using a non-Internet browser WINDOWS viewer coupled with a local area networked protocol such as the Internet Packet Exchange (IPX), dial-up, third-party, private network or a value-added network (VAN).

Moreover, a plurality of data file types is envisioned herein. For example, the present invention preferably supports various suitable multi-media file types, including (but not limited to) JPEG, BMP, GIF, TIFF, MPEG, AVI, SWF, RAW or the like (as known to those skilled in the art).

Figure 2:
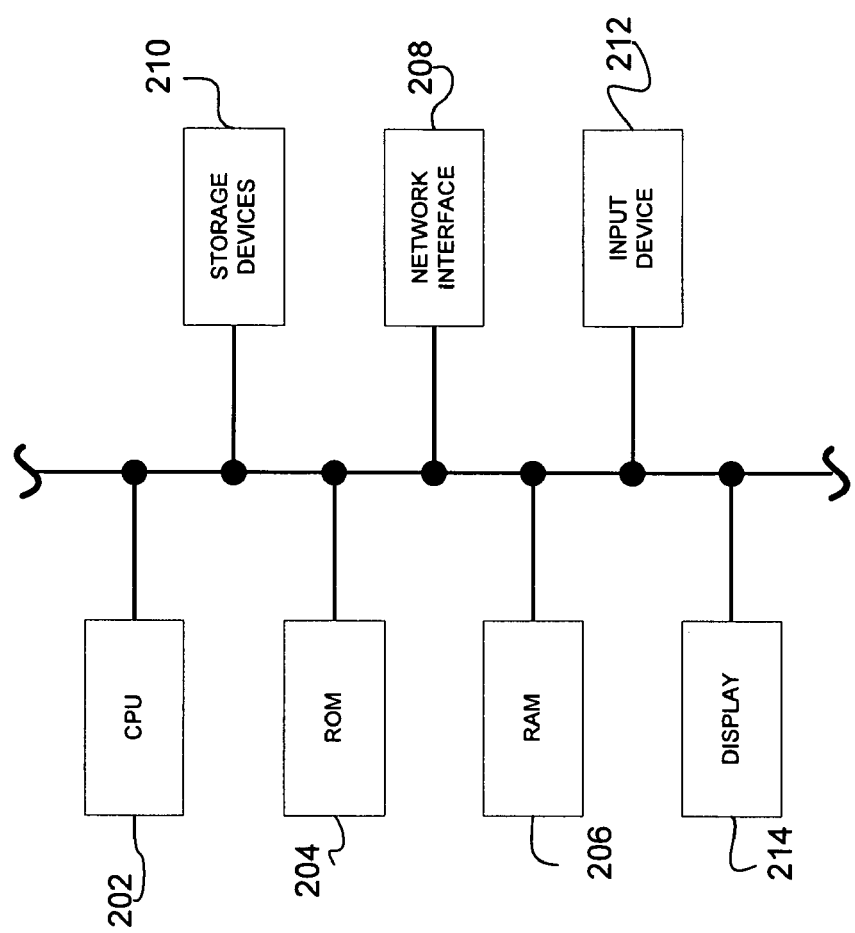
FIG. 2 illustrates the functional elements of a workstation and/or information processor.

FIG. 2 illustrates the functional elements of workstation 104 and/or information processor 102. The functional elements include one or more central processing units (CPU) 202 used to execute software code and control the operation of workstation 104 or information processor 102, read-only memory (ROM) 204, random access memory (RAM) 206, one or more network interfaces 208 to transmit and receive data to and from other computing devices across a communication network, storage devices 210 such as a hard disk drive, floppy disk drive, tape drive, CD ROM or DVD for storing program code, databases and application data, one or more input devices 212 such as a keyboard, mouse, track ball, magnetic card reading device, bar code reading device, microphone or the like, and a display 214.

The various components of information processor 102 and/or workstation 104 need not be physically contained within the same chassis or even located in a single location. For example, storage device 210 may be located at a site which is remote from the remaining elements of information processor 102 or workstation 104, and may even be connected to CPU 202 across communication network 106 via network interface 208. Information processor 102 preferably includes a memory equipped with sufficient storage to provide the necessary databases, forums, and other community services as well as acting as a web server for communicating hypertext mark-up language (HTML), FLASH, AJAX, DHTML, Action Script, Java, Active Server Pages, Active-X control programs on workstations 104. Information processor 102 are arranged with components, for example, those shown in FIG. 2, suitable for the expected operating environment of information processor 102. The CPU(s) 202, network interface(s) 208 and memory and storage devices are selected to ensure that capacities are arranged to accommodate expected demand.

As used herein, the term, "module" refers, generally, to one or more discrete components that contribute to the effectiveness of the present invention. Modules can operate or, alternatively, depend upon one or more other modules in order to function.

FIGS. 3-15 are flowcharts illustrating steps associated with features in accordance with a preferred embodiment of the present invention.

The steps illustrated and FIGS. 3-15 and described herein are not meant to limit the present invention to one particular order of operation, or to otherwise preclude the addition or removal of one or more steps or conditions.

Figure 3:
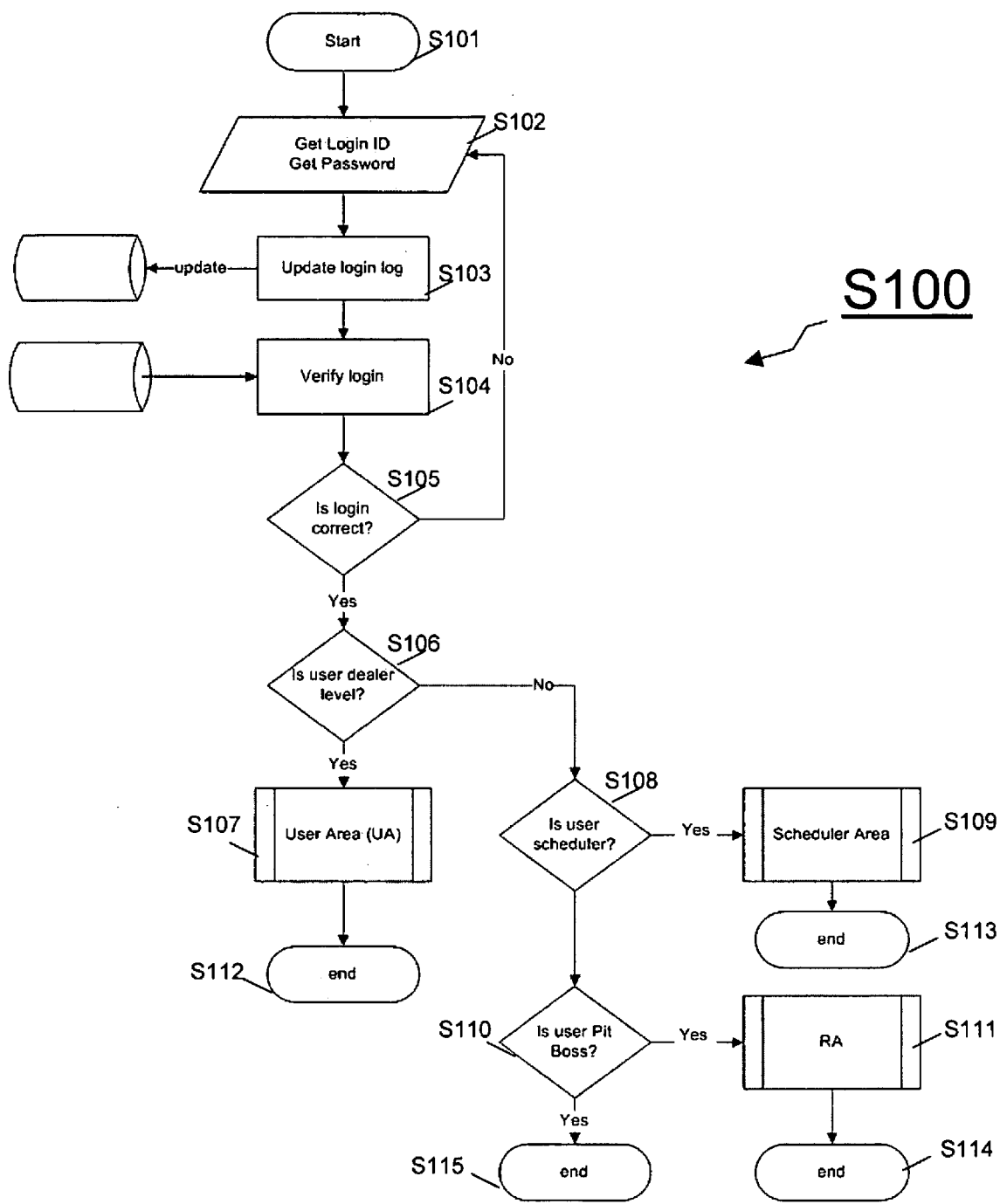
FIG. 3 is a flow chart illustrating a high level view of steps associated with a preferred embodiment.

FIG. 3 is a flow chart illustrating a high level view of steps S100 associated with the present invention. At step S101, a user accesses system 100, for example, by entering a URL into an address bar in a web browser software application. Thereafter, system 100 receives authorization information, such as by prompting a user for a user ID and password, submitted by the user (step S102). Once the authorization information is received, system 100 preferably automatically updates a database, "login log," for example to track instances when users log into to system 100 (or otherwise attempt to log in) (step S103). System 100 also accesses a database to verify the authorization information received by the user (step S104). At S105, a determination is made whether the authorization information submitted by the user can be verified, e.g., is listed in the database. In case the authorization cannot be verified, then the process loops back to step S102 and the user is prompted to resubmit authorization information.

Continuing with reference to the flowchart shown in FIG. 3, in case system 100 determines at step S105 that authorization information received by the system at step S104 is verified, then the process branches to step S106 and system 100 makes a determination as to the type of user that has logged into the system, e.g., a dealer, a scheduler, a pit boss or an RA. At step S106, system 100 determines whether the user is authorized as a dealer and, if so, the process branches to step S107 and system 100 provides various displays screens and executes steps associated with dealer user areas.

User areas that are provided and/or displayed to users at the dealer level preferably display information, enable users to request private time off or call out time, and do not enable the user to effect scheduling or make revisions to data representing, for example, games, personnel assignments, table assignments or the like.

In case the determination made at step S1106 is that the user is not at the dealer level, then the process branches to step S108 and system 100 determines whether the user is a scheduler. If system 100 determines that the user is at the scheduler level, then the process branches to step S109 and schedule area data entry display screen(s) are preferably provided for the user to create and edit schedules, view data reports, add/edit employee-related data and perform database operations such as back-up data and restore data operations and referred to herein, generally, as "tools."

In case the determination made at step S108 is that the user is not at the scheduler level, then the process branches to step S110 and system 100 determines whether the user is at the roadmap administrator level, such as a pit boss, as known in the art. If system 100 determines that the user is at the roadmap administrator level, then the process branches to step S111 and roadmap administrator area data entry display screen(s) are preferably provided for the user to assign table games, activate/deactivate tables and assign dealers to particular tables. After providing data entry display screen(s) associated with the user area (step S107), the scheduler area (step S109), or the roadmap administrator area (step S111), then the process associated with steps S100 preferably ends at steps S112, S113, S114, respectively. Alternatively, if system 100 determines at step S110 that the user is not a roadmap administrator, the process associated with steps S100 preferably ends at step S115.

Figure 4:
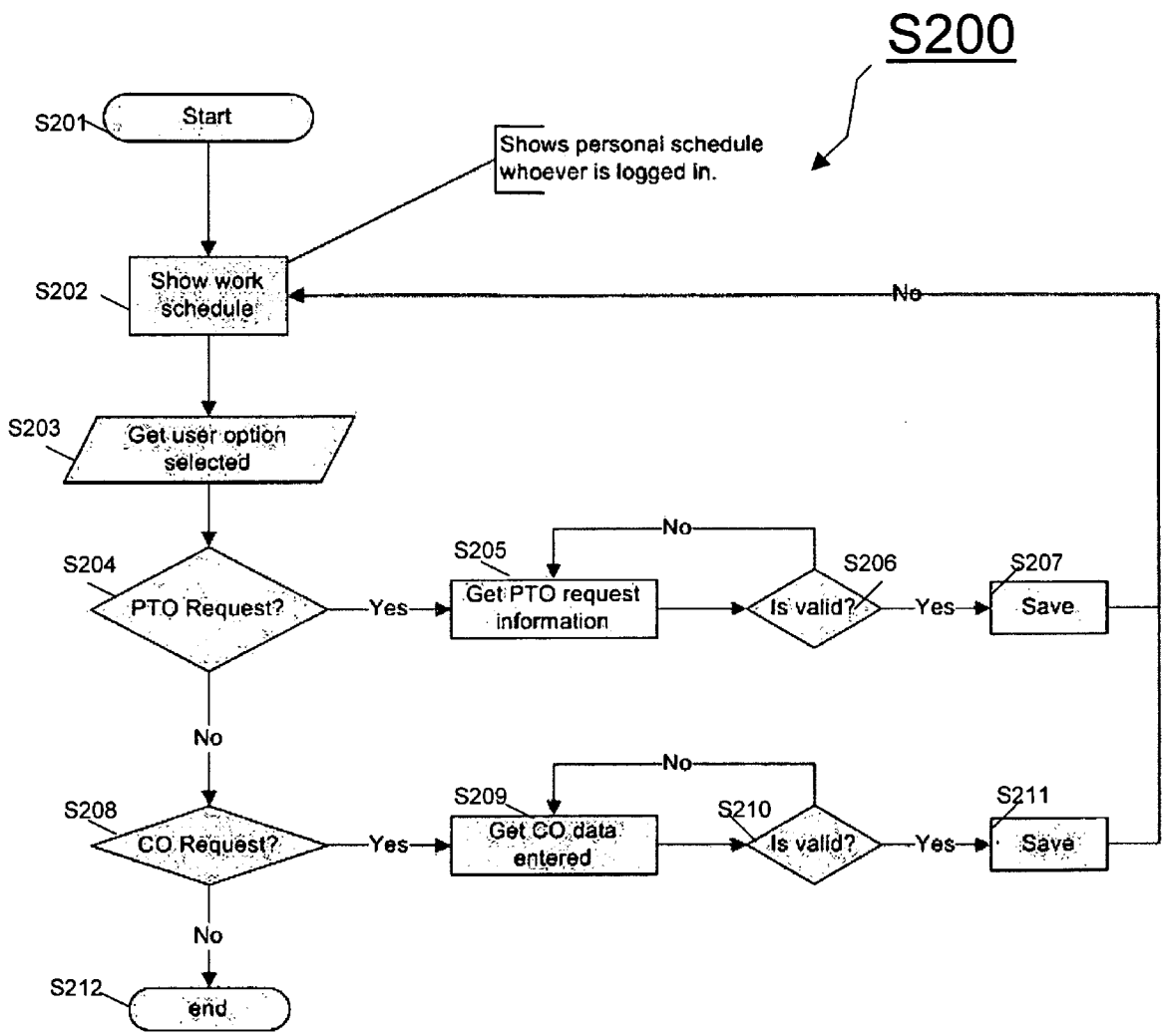
FIG. 4 is a flow chart illustrating steps associated with features provided to a user who is determined to be at the dealer level.

FIG. 4 is a flow chart illustrating steps S200 associated with features provided to a user that system 100 has determined in step S106 is at the dealer level (S107). At step S201, the process starts and, thereafter, a work schedule is preferably displayed to the user (step S202). The user is preferably provided with options, such as to select a request for private time off or for call out time. When a user makes a selection, the selection is preferably received in step S203 and a series of determinations are preferably made by system 100 for properly handling the selections. For example, at step S204, system 100 determines whether the selection is a request for private time off. If so, then at step S205, information relating to the private time request is received by system 100, and a determination is made, at step S206, whether the request is valid. For example, the request may contain information that is recognized by system 100 to contain information, such as a user name, date or time that does not exist. In case the private time off request is not valid then the process loops back to step S205. If the determination in step S206 is that the request is valid, then the process branches to step S207 and the request is saved and the process loops back step S202 and the work schedule is preferably displayed.

In case the determination made at step S204 is that the user has not selected an option for private time off, then the process branches to step S208 and a determination is made whether the user has selected an option for call out time. If so, then at step S209, information relating to the call out request is received by system 100, and a determination is made, at step S210, whether the request is valid. For example, the request may contain information that is recognized by system 100 to contain information, such as a user name, date or time that does not exist. In case the call out off request is not valid then the process loops back to step S209. If the determination in step S210 is that the request is valid, then the process branches to step S211 and the call out request is saved and the process loops back step S202 and the work schedule is preferably displayed.

In case the determination made at step S208 is that the user has not selected a request for call out off, then the process branches to step S212 and the process associated with steps S200 preferably ends.

Figure 5:
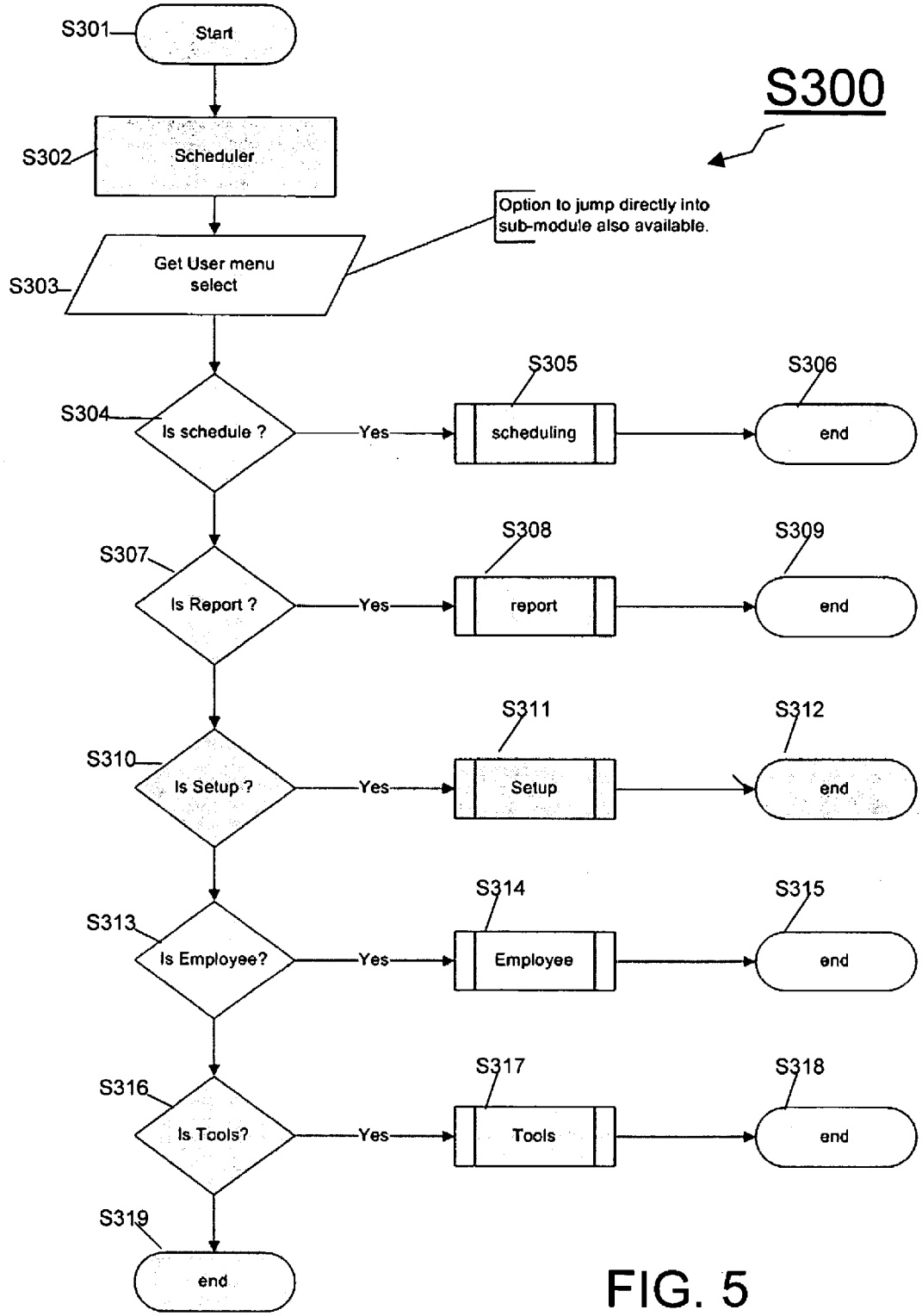
FIGS. 5-7 are flow charts illustrating steps associated with scheduling in accordance with an example embodiment.

FIG. 5 is a flow chart illustrating steps S300 associated with features provided to a user that system 100 has determined in step S106 (FIG. 3) is at the scheduler level (S109). At step S301, the process starts and, thereafter, a series of options, preferably formatted as graphical screen controls, including, for example, push buttons, radio buttons, text boxes, drop down lists, menu choices or the like, relating to scheduling is preferably displayed to the user (step S302). The user is preferably provided with options related to schedules, reports, setup values (e.g., shift, private time off, holiday, etc.), employee management, or data management tools. When a user makes a selection, the selection is preferably received in step S303 and a series of determinations are preferably made by system 100 for properly handling the selections. In an alternative embodiment, users may be provided, for example, with modules or other data entry screens that enable data entry values to be submitted directly into system 100 in a format other than a menu system. For example, a series of push buttons may be provided for a user to select that enable the user to access a data entry display form for creating a schedule.

Continuing with reference to FIG. 5, at step S304, system 100 determines whether the user selection is a request is related to schedules. If so, then at step S305, system 100 preferably provides data entry display screen(s) associated with scheduling. Thereafter, the process associated with steps S300 preferably ends (step S306).

In case the determination made at step S304 is that the user has not selected a request to view a schedule, then the process branches to step S307 and a determination is made whether the user has selected a request to for reports. If so, then the process branches to step S308 and data entry display screen(s) providing steps associated with reports are provided to the user. Steps associated with reporting are described in greater detail below. After the steps associated with reporting are provided to the user in step S308, then the process associated with steps S400 preferably ends (step S309).

In case the determination made at step S307 is that the user has not selected a request for reporting, then the process branches to step S310 and a determination is made whether the user has selected a request for setup values. If so, then the process branches to step S311 and data entry display screen(s) providing steps associated with setup values (e.g., shift, private time off, holiday, etc.) are provided to the user. Steps associated with setup values are described in greater detail below and with reference to the flow charts shown in FIGS. 3-15. After the steps associated with setup values are provided to the user in step S311, then the process associated with steps S300 preferably ends (step S312).

Alternatively, if system 100 determines at step S310 that the user has not selected a request for creating a setup values, then the process branches to step S313 and a determination is made whether the user has selected a request for employee management. If so, then the process branches to step S314 and data entry display screen(s) providing steps associated with employee management are provided to the user. Steps associated with employee management are described in greater detail below and with reference to the flow charts shown in FIGS. 3-15. After the steps associated with employee management are provided to the user in step S314, then the process associated with steps S300 preferably ends (step S315).

Alternatively, if system 100 determines at step S313 that the user has not selected a request for employee management, then the process branches to step S316 and a determination is made whether the user has selected a request for data management (displayed in FIG. 5 as "Tools"). If so, then the process branches to step S317 and data entry display screen(s) providing steps associated with data management are provided to fhe user. Steps associated with data management include, for example, performing data backup and restore functions, and/or various data utility functions such as compression, repair or the like. After the steps associated with tools are provided to the user in step S317, then the process associated with steps S300 preferably ends (step S318). Alternatively, if system 100 determines at step S316 that the user has not selected a request for tools, then the process associated with steps S300 preferably ends at step S319.

Figure 6:
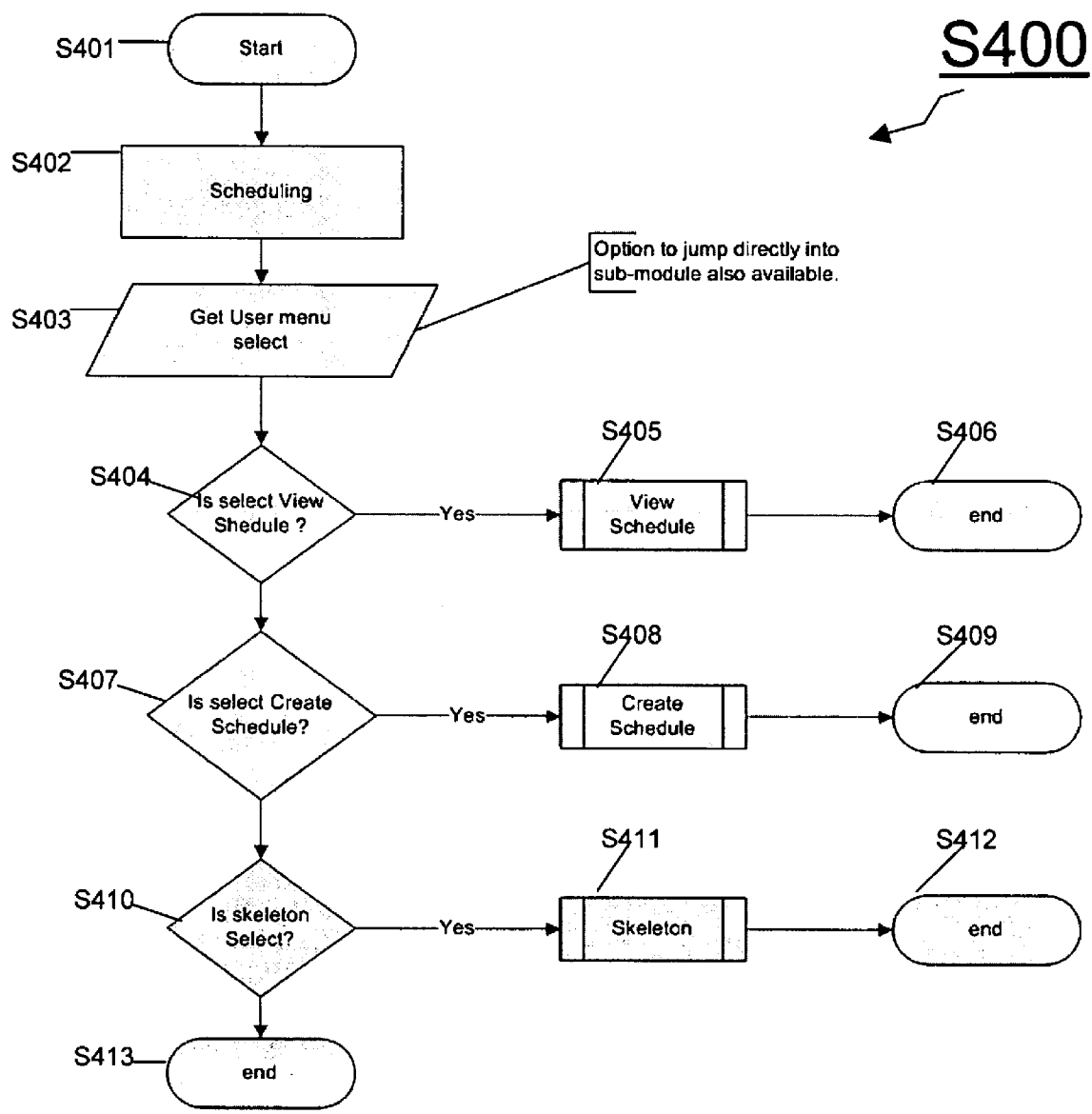

FIG. 6 is a flow chart illustrating steps S400 associated with features provided to a user that system 100 has determined in step S304 (FIG. 5) that the user is requesting scheduling (S305). At step S401, the process starts and, thereafter, a series of options, preferably formatted as graphical screen controls, including, for example, push buttons, radio buttons, text boxes, drop down lists, or the like, relating to scheduling is preferably displayed to the user (step S402). The user is preferably provided with options, such as to select a request to view schedules, create schedules or create a "skeleton" schedule. As used herein, a skeleton schedule refers to a schedule of tables, games and/or times that are used to automatically define a schedule, but without assigning individuals to the tables. After a skeleton schedule is defined or assigned, then the user preferably accesses scheduling (step S109) to assign personnel to respective games, tables or the like.

When a user makes a selection, the selection is preferably received in step S403 and a series of determinations are preferably made by system 100 for properly handling the selections. In an alternative embodiment, users may be provided, for example, with modules or other data entry screens that enable data entry values to be submitted directly into system 100 in a format other than a menu system. For example, a series of push buttons may be provided for a user to select that enable the user to access a data entry display form for creating a schedule.

Continuing with reference to FIG. 6, at step S404, system 100 determines whether the user selection is a request to view a schedule. If so, then at step S405, system 100 preferably displays a schedule. After the schedule is displayed, the process associated with steps S400 preferably ends (step S406).

In case the determination made at step S404 is that the user has not selected a request to view a schedule, then the process branches to step S407 and a determination is made whether the user has selected a request to create a schedule. If so, then the process branches to step S408 and data entry screens providing steps associated with creating a schedule are provided to the user. Steps associated with creating a schedule are described in greater detail below and with reference to the flow charts shown in FIGS. 3-15. After the steps associated with creating a schedule are provided to the user in step S408, then the process associated with steps S400 preferably ends (step S409).

In case the determination made at step S407 is that the user has not selected a request to create a schedule, then the process branches to step S410 and a determination is made whether the user has selected a request to create a skeleton schedule. If so, then the process branches to step S411 and steps associated with creating a skeleton schedule are provided to the user. Steps associated with creating a skeleton schedule are described in greater detail below and with reference to the flow charts shown in FIGS. 3-15. After the steps associated with creating a skeleton schedule are provided to the user in step S411, then the process associated with steps S400 preferably ends (step S412).

Alternatively, if system 100 determines at step S410 that the user has not selected a request for creating a skeleton schedule, then the process associated with steps S400 preferably ends at step S413.

Figure 7:
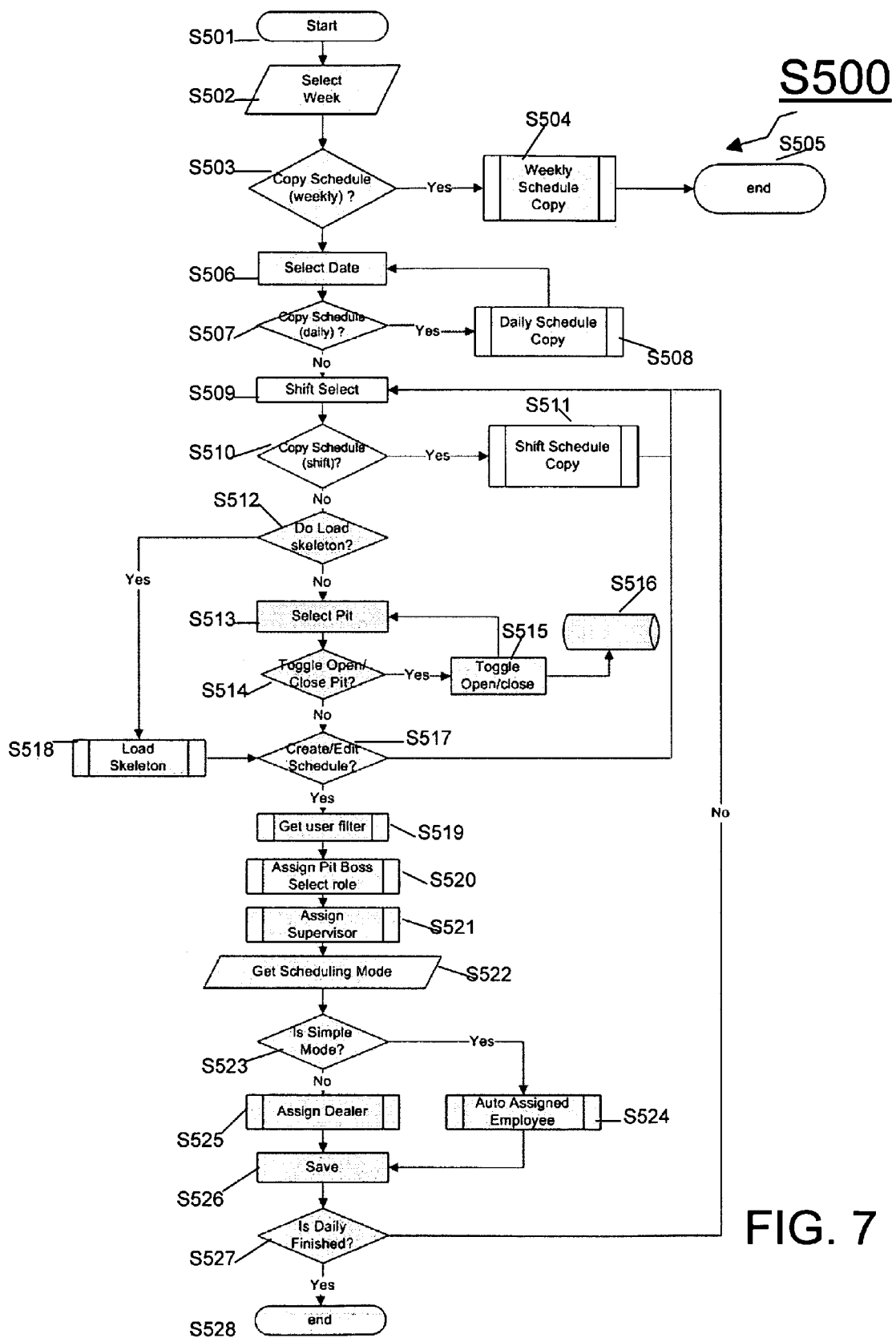

FIG. 7 is a flow chart illustrating steps S500 associated with features provided to a user that system 100 has determined in step S407 (FIG. 6) that the user is requesting to create a schedule (S408). At step S501, the process starts and the user is preferably prompted to select a range of dates, such as a week, for the respective schedule (step S502). Thereafter, system 100 makes a determination whether the user has selected an option to copy an existing schedule that was previously defined (step S503). If so, then steps associated with copying a schedule for the defined time frame (e.g., one-week) are preferably provided for the user (step S504). Thereafter, the process associated with steps S500 preferably ends. If system 100 determines in step S503 that the user has not selected to copy a schedule (e.g., a weekly schedule), then the process branches to step S506 and the user selects a date to submit a schedule for a single day. At step S507, a determination is made whether the user is electing to copy an existing schedule that was previously defined. If so, then the process branches to step S508 and a schedule that was previously defined is copied for the daily schedule. If, alternatively, the determination at step S507 is that the user is not copying a schedule, then, at step S509, the user selects a respective shift for the schedule. A shift may comprise, for example, a period of time within a specific day (e.g., 9:00 a.m. to 3:00 p.m.). Thereafter, a determination is made by system 100 whether the user is electing to copy a previously scheduled shift (step S510). If so, then steps associated with copying a shift schedule are preferably provided for the user (step S511). Thereafter, the process branches back to step S509 and another shift can be selected by the user.

Alternatively, if the determination at step S510 is that the user is not electing to copy a shift schedule, then, at step S512, a determination is made whether the user is electing to load a skeleton schedule. If not, then at step S513, the user is prompted to select a respective pit within the location. Thereafter, the user is prompted to select an option whether to open or close the selected pit (step S514). If the user elects to toggle the pit and, accordingly, defines the pit as opened or closed, then, at step S515, the user selects an option to toggle the selected pit as opened or closed. Preferably, at step S516, an entry is made in a database to store the respected context of the selected pit (i.e., opened or closed). Thereafter, the process branches back to step S513, and the user is prompted to select a different pit or to modify the previously selected pit. If, at step S514, a determination is made that user has not selected an option to toggle the pit (i.e., to open or close the pit), then the process branches to step S517 and a determination is made by system 100 whether to create or edit the schedule.

In the event, at step S511, that the user has selected to load a skeleton schedule, then the process preferably branches to step S518 and a skeleton schedule is preferably loaded, for example, from a database. The steps associated with loading a skeleton schedule are preferably provided for the user in step S518. Thereafter, the process branches to step S517 and the user is prompted and a determination is made for creating or editing a schedule. If the user elects not to create or edit a schedule in step S517, based on that determination, the process branches back to step S509 and another shift (or alternatively the same shift) is selected and the process continues to step S510. Alternatively, if the user selects at S517 to create or edit a schedule, then the process branches to step S519 and the user is prompted for a filter. User filtering is a feature of the present invention that enables refining scheduling for respective users as a function of the user's availability, shift, skill set, and work history. For example, if a user has been assigned to a table that is frequently generating substantial revenue, for example, for dealers, then the filter function of the present invention preferably distributes dealers fairly and equally throughout the establishment. Filtering is available in various other contexts, as well, and is described herein. Thereafter, the process continues to step S520 and a pit boss is assigned and selected for a respective role. The process continues to step S521 and a supervisor is preferably assigned for the schedule. Steps associated with getting a user filter, assigning a pit boss and selecting a role, and assigning a supervisor are preferably provided to the user by system 100. At step S522, system 100 preferably provides an option for the user to select a scheduling mode.

The scheduling mode (step S522) enables a user to use a "simple mode" that automatically assigns employees, such as dealers, to various tasks and areas of the establishment. At step S523, system 100 makes a determination whether the user has selected simple mode for scheduling, and if so, the process branches to step S524 and employees are automatically assigned by system 100. The selections of employees are preferably made based on data submitted during regarding users, including, for example, an employee's particular proficiency at one or more tasks or games, an employee's scheduled availability or the like. Alternatively, if the determination at step S523 is that the scheduling mode is not in simple mode, then the user is preferably prompted, at step S525, to select a dealer, for example, from a drop-down list in order to assign the dealer. Thereafter, at step S526, the options made for scheduling are preferably saved. At step S527, a determination is made whether the daily scheduling is complete and, if not, then the process branches back to step S509 and a shift is preferably selected. Alternatively, if system 100 determines that the scheduling for the day is complete in step S527, then the process associated with steps S500 preferably ends (step S528).

Figure 8:
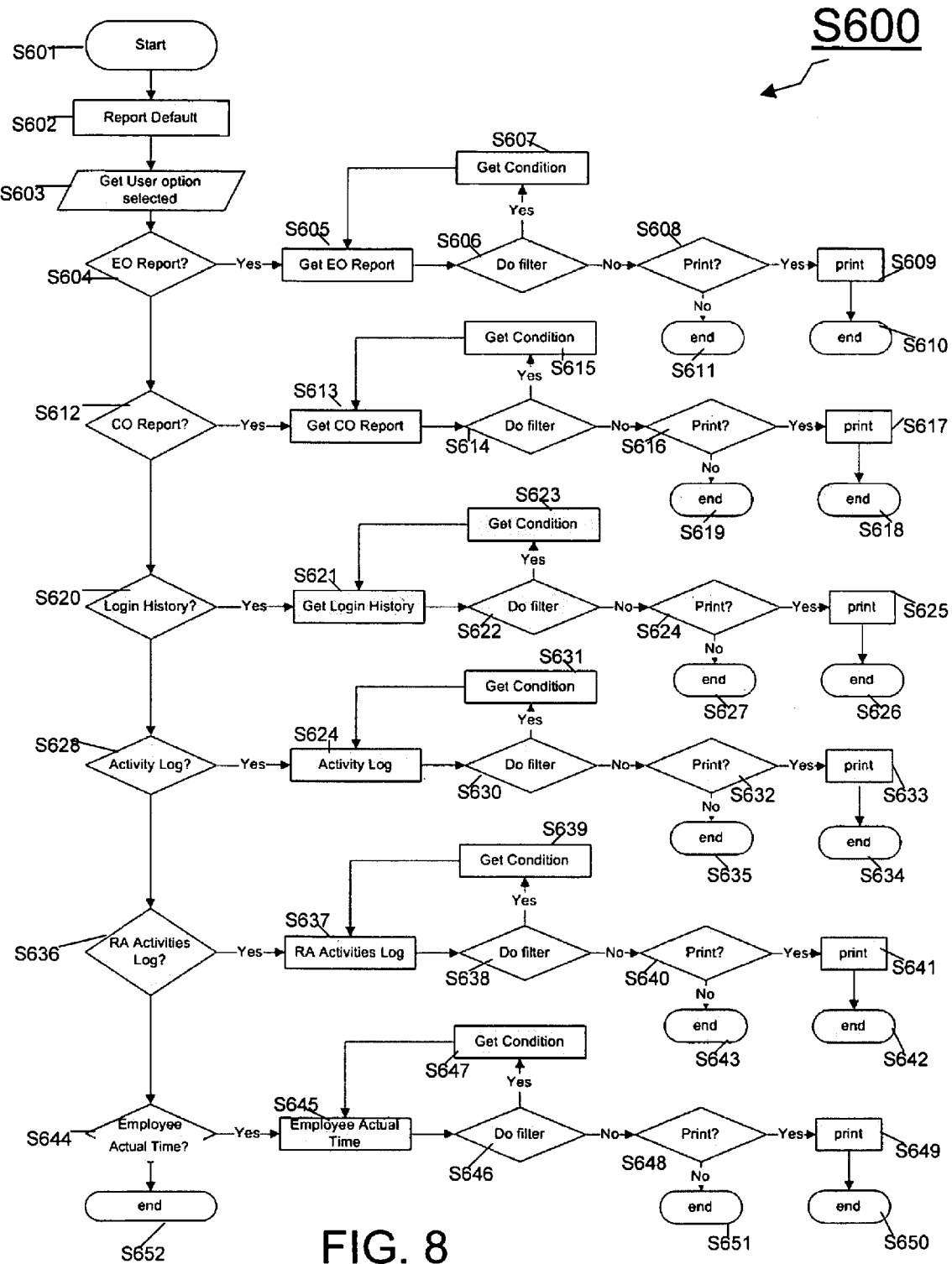
FIG. 8 is a flow chart illustrating steps associated with reporting in accordance with an example embodiment.

FIG. 8 is a flowchart that illustrates steps S600 that are associated with features provided to a user that system 100 has determined in step S307 that a user has selected a request for reports (step S308). At step S601, the process starts and, thereafter, a series of options, preferably formatting the graphical screen controls including, for example, push buttons, radio buttons, text boxes, drop-down lists, many choices or the like, relating to reports is preferably displayed to the user (step S602). The user is preferably provided with options related to reports, and the user makes a selection, which is received in step S603. At step S604, a determination is made whether the user has selected a choice for an early out report ("EO") (step S604). Early out refers to employees who request an early dismissal from a workday, for example, in case too many employees have been scheduled for a particular day. The early out report preferably displays employees who have been granted, or, alternatively, requested an early dismissal (i.e., an early out). At step S605, a list of users is preferably displayed, for example, in a table, that identify employees or users who have been granted early out and have amassed early out points. At step S606, system 100 makes a determination whether the user has selected various filtering mechanisms, for example, a date range or a predefined period of time, such as, within a month, or a comparison to a particular date one year ago. If at step S606 system 100 determines that a filter has been selected, then the filtered condition is preferably received (step S607) and the data for the EO report is preferably retrieved (step S605). If at step S606 a determination is made that no filtering (or further filtering) is defined, then the option to print the report is provided to the user (step S608).

In a preferred embodiment, an icon appearing as a printer device is selectable to automatically generate a formatted output report that identifies the establishment, the print time and date, identification of any filtering conditions, and the respective users who have been granted early out and amassed early out points. Thereafter, a determination is made whether the user desires to output the report to a printing device and, if so, the report is output to a printer or other printing device at step S609 and the process associated with steps S600 preferably ends at step S610. If the user elects not to output the report to a printing device, then at step S611, the process associated with steps S600 preferably ends.

Continuing with reference to FIG. 8, at step S612, a determination is made whether the user has selected a choice for a call out report ("CO"). At step S613, a list of employees is preferably displayed, for example, in a table, that identify employees or users who have been granted call out and have amassed call out points. At step S614, system 100 makes a determination whether the user has selected various filtering mechanisms, for example, a date range or a predefined period of time, such as, within a month, or a comparison to a particular date one year ago. If at step S614 system 100 determines that a filter has been selected, then the filtered condition is preferably received (step S615) and the data for the CO report is preferably retrieved (step S613). If at step S614 a determination is made that no filtering (or further filtering) is defined, then the option to print the CO report is provided to the user (step S616).

A formatted output report that identifies the establishment, the print time and date, identification of any filtering conditions, and the respective users who have been granted call out and amassed call out points is preferably available. A determination is made whether the user desires to output the report to a printing device and, if so, the report is output to a printer or other printing device at step S617 and the process associated with steps S600 preferably ends at step S618. If the user elects not to output the CO report to a printing device, then at step S619, the process associated with steps S600 preferably ends.

Continuing with reference to FIG. 8, at step S620, a determination is made whether the user has selected a choice for a login history report. At step S621, a list of employees is preferably displayed, for example, in a table, that identify employees or users who have logged into system 100, for example by supplying a user name and password. At step S622, system 100 makes a determination whether the user has selected various filtering mechanisms, for example, a date range or a predefined period of time, such as, within a month, or a comparison to a particular date one year ago. If at step S622 system 100 determines that a filter has been selected, then the filtered condition is preferably received (step S623) and the data for the login history report is preferably retrieved (step S621). If, at step S622, a determination is made that no filtering (or further filtering) is defined, then the option to print the login history report is provided to the user (step S624).

Preferably, an icon appearing as a printer device is selectable to automatically generate a formatted output report that identifies the establishment, the print time and date, identification of any filtering conditions, and the respective users who have logged into system 100. Thereafter, a determination is made whether the user desires to output the report to a printing device and, if so, the report is output to a printer or other printing device at step S625 and the process associated with steps S600 preferably ends at step S626. If the user elects not to output the login history report to a printing device, then at step S627, the process associated with steps S600 preferably ends.

Continuing with reference to FIG. 8, at step S628, a determination is made whether the user has selected a choice for an activity history report. At step S621, a list of employees is preferably displayed, for example, in a table, that identify employees or users who have logged into system 100 and the various steps and display screen selections they made. At step S630, system 100 makes a determination whether the user has selected various filtering mechanisms, for example, a date range or a predefined period of time, such as, within a month, or a comparison to a particular date one year ago. If at step S630 system 100 determines that a filter has been selected, then the filtered condition is preferably received (step S631) and the data for the activity log report is preferably retrieved (step S621). If, at step S630, a determination is made that no filtering (or further filtering) is defined, then the option to print the activity report is provided to the user (step S632).

Thereafter, a determination is made whether the user desires to output the report to a printing device and, if so, the report is output to a printer or other printing device at step S633 and the process associated with steps S600 preferably ends at step S634. If the user elects not to output the activity report to a printing device, then at step S635, the process associated with steps S600 preferably ends.

Effectively, the same steps are operable for a user to select RA Activities log reports and employee actual time working reports. Examples are shown in connection with steps S636-S652.

Figure 9:
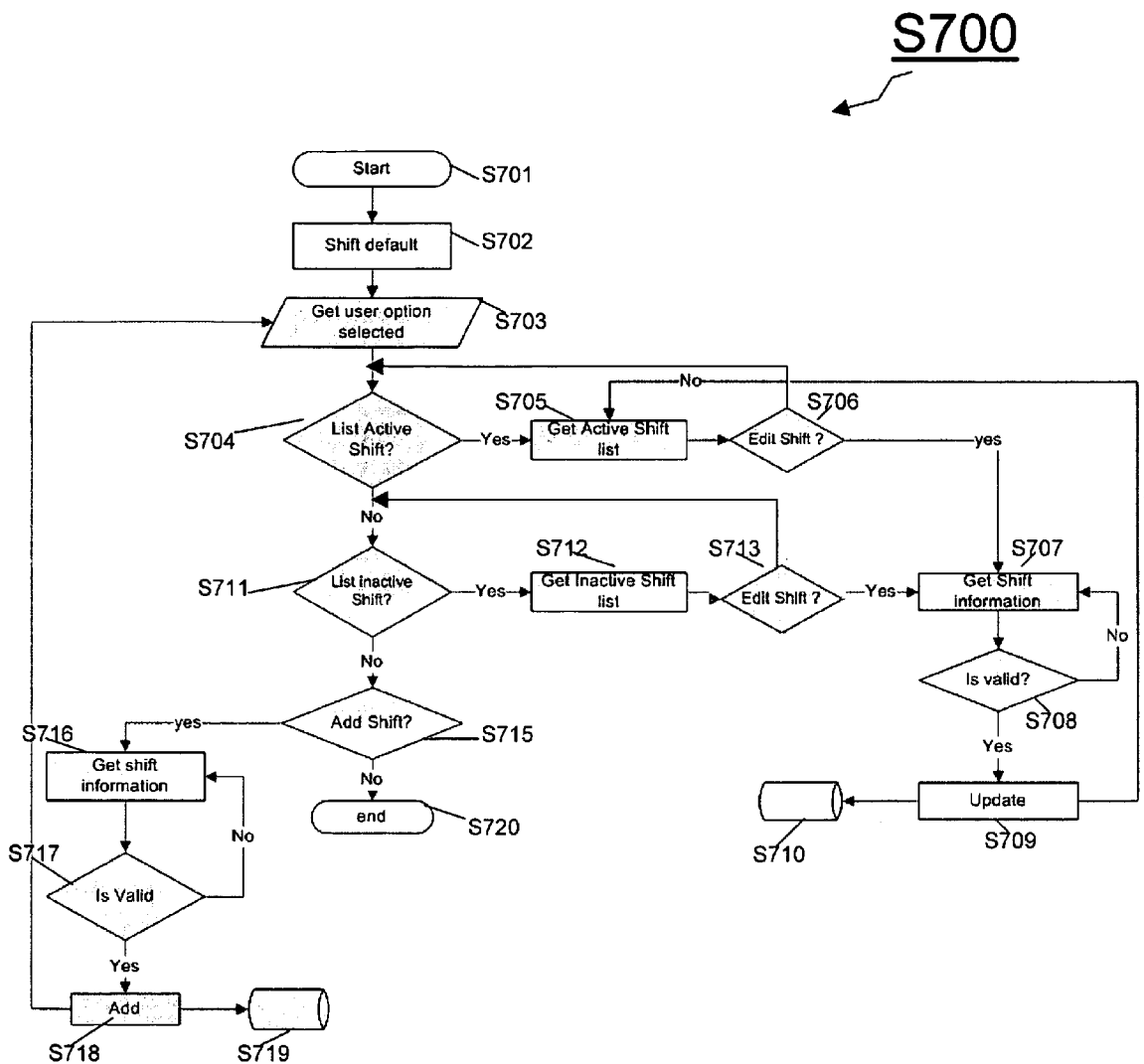
FIGS. 9-13 are flow charts illustrating steps associated with setting up values, game data and employee data, in accordance with an example embodiment.

FIG. 9 is a flowchart that illustrates steps S700 that are associated with features provided to a user that system 100 has determined in step S310 that the user is requesting setup values (step S311). At step S701, the process starts and, thereafter, a series of options, preferably formatted as graphical screen controls, including, for example, push buttons, radio buttons, text boxes, drop-down lists or the like relating to shift setup is preferably displayed to the user (S702). At S703, a user option relating to shift setups is preferably received (S703). Thereafter, a determination is made, at step S704, whether the user is requesting a list of active shifts. If so, then at step S706, a determination is made whether the user is electing to edit the shift. If not, then the process loops back to step S704. If, alternatively, the determination at step S706 is that the user is selecting an option to edit a selected shift, then, the process branches to step S707 and shift information is preferably retrieved. Examples of shift information that can be edited includes the shift name, the start time, the end time and the status of the shift (e.g., active range). Thereafter, after the user has edited shift information, then, at step S708, a determination is made whether the user's data entry is valid. For example, if the user has submitted a date that does not exist, then the data would be invalid. If, in step S708, the determination is that the data is not valid, then the process loops back to step S707 and shift information is received. Alternatively, if the data is valid, then at step S709, the shift information is preferably updated and, at step S710, stored in a database.

Alternatively, if the determination at step S704 is that the user did not select an option to list active shifts, then a determination is made, at step S711, whether the user has selected an option to list inactive shifts. If so, then, at step S712, a list of inactive shifts is preferably retrieved and provided for the user. At step S713, the user is prompted whether to edit information representing the inactive list. If so, then the process branches back to step S707 for updated information. Alternatively, if the user elects not to edit the active shifts, then, the process preferably branches to step S711. If the determination at step S711 is that the user has not selected an option for a list of inactive shifts, then a determination is made at step S715 whether the user has selected an option to add a new shift. If so, then the process branches to step S716 and shift information for adding a new shift is preferably added by the user and received by system 100. Thereafter, at step S717, a determination is made whether the information submitted by the user is valid and, if not, then the process branches back to S716. If the information submitted in step S716 is valid, then the process branches to step S718 and the new information is preferably added. Thereafter, the process branches back to step S703 and user options are preferably received. Further, the new information submitted by the user in step S716 is preferably stored in a database (step S719). After step S709, the process preferably loops back to step S705. Alternatively, if system 100 determines at step S715 that the user has not selected a request to add a shift, then the process associated with steps S700 preferably ends at step S720.

Figure 10:
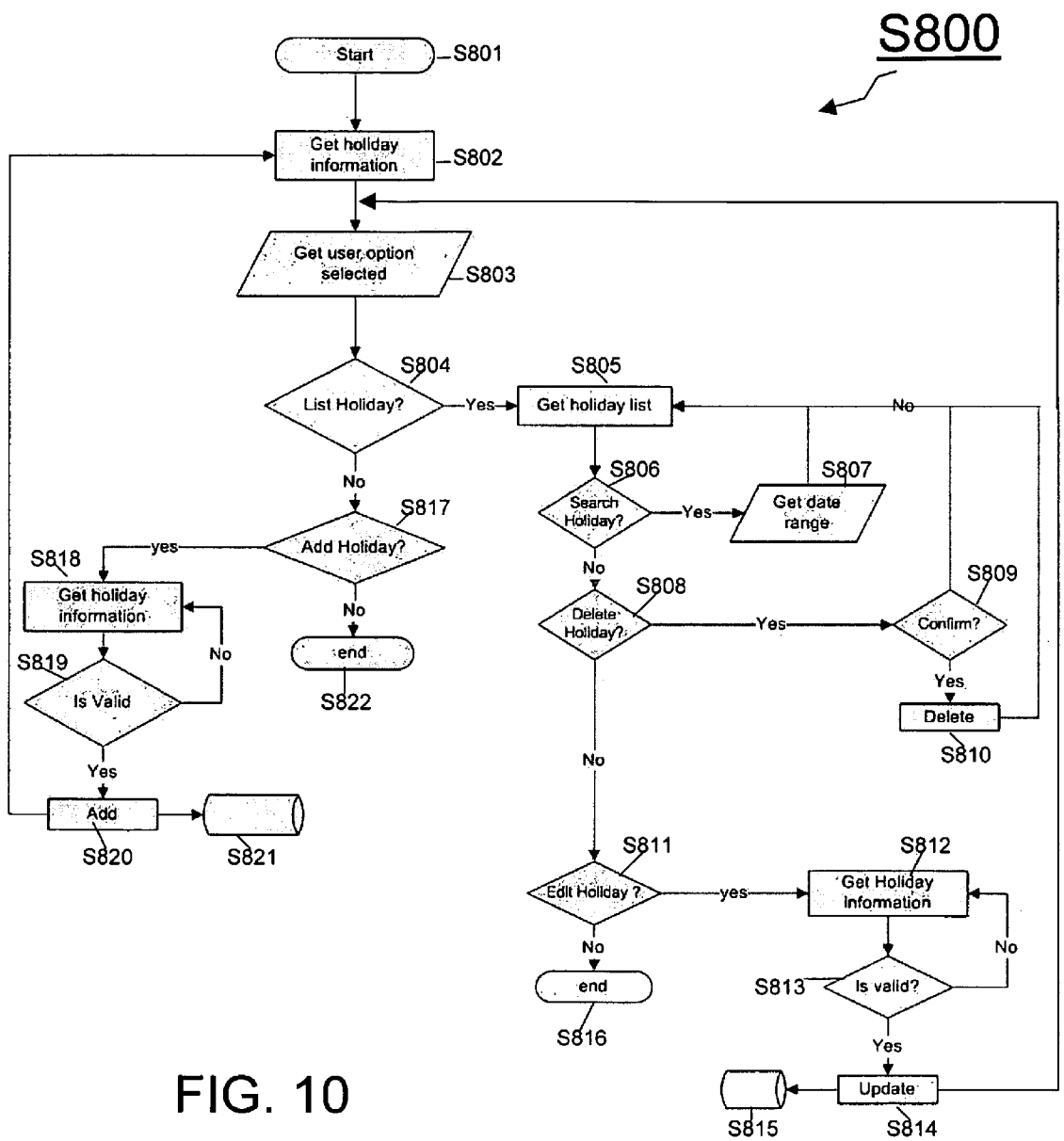

FIG. 10 is a flowchart illustrating steps S800 associated with features provided to a user that system 100 has determined in step S310 that a user has selected a request for setup values (step S311). At step S801, the process starts and, thereafter, a series of options related to holiday information is preferably displayed to the user (step S802). At step S803, a user selects an option and the option is received by system 100 (step S803). At step S804, a determination is made whether the user has requested a list of holidays. If so, then at step S805, a list of holidays is preferably displayed to the user, for example, in a table form. At step S806, a determination is made whether a user has selected an option to search within a particular range for holidays. If so, then at step S807, a date range is preferably submitted by the user in order to generate a new list of holidays (step S807) and the process loops back to step S805. If, alternatively, the determination at step S806 is that the user has not selected an option to search for a holiday, then at step S808, a determination is made whether the user has selected an option to delete a respective holiday. If so, then at step S809, the user is prompted to confirm whether or not to delete a respective holiday, and, if so, the holiday is deleted from system 100 at step S810. Alternatively, if the determination in step S809 is that the user does not confirm deleting the holiday, then the process branches back to step S805. Alternatively, at step S808, if the determination is that the user has not selected an option to delete a holiday, then at step S811, a determination is made whether a user has selected an option to edit a respective holiday. If so, then at step S812, holiday information is provided for the user to edit. Examples of types of holiday information to edit include the name of a holiday and the date of a holiday. Thereafter, after the information is submitted by the user, at step S813, a determination is made whether the information submitted by the user is valid. If not, the process branches back to step S812. If so, then the process branches to step S814, and system 100 updates the database at step S815. Thereafter, the process branches back to step S803. If, alternatively, the determination at step S811 is that the user is not selecting an option to edit the holiday, then the process preferably ends at step S816.

If the determination at step S817 is that the user has not selected an option for a list of holidays, then a determination is made at step S817 whether the user has selected an option to add a new holiday. If so, then the process branches to step S818 and holiday information for adding a new holiday is preferably added by the user and received by system 100. Thereafter, at step S819, a determination is made whether the information submitted by the user is valid and, if not, then the process branches back to S818. If the information submitted in step S819 is valid, then the process branches to step S820 and the new information is preferably added. Thereafter, the process branches back to step S802 and user options are preferably received. Further, the new information submitted by the user in step S818 is preferably stored in a database (step S821). Alternatively, if system 100 determines at step S817 that the user has not selected an option to add a holiday, then the process associated with steps S800 preferably ends at step S822.

Figure 11:
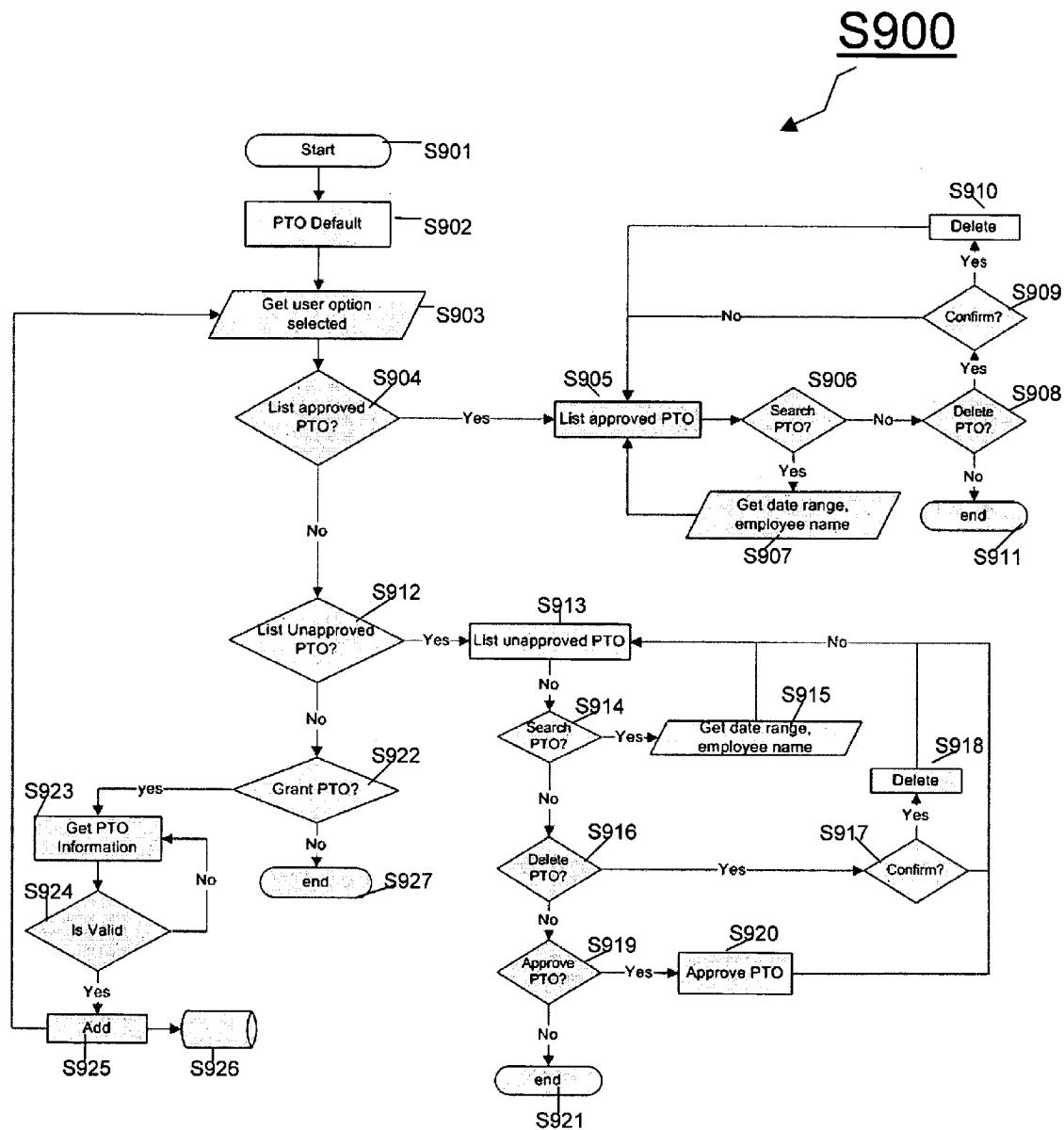

FIG. 11 is a flowchart illustrating steps S900 associated with features provided to a user that system 100 has determined in step S310 that the user has selected an option for setup values, particularly, related to private time off (step S311). At step S901, the process starts and, thereafter, options are provided for a user to view and/or edit private time off requests and grants (step S902). At step S903, a user makes a selection with respect to private time off and at system 100 receives that selection. At step S904, a determination is made whether the user has selected an option to review a list of approved private time off. If so, then the process branches to step S905 and a list of approved private time off is generated for the user. At step S906, a determination is made whether the user has selected an option to search private time off, for example, as a function of date ranges or employee names. If the determination at step S906 is that the user has selected an option to search for a respective private time off approvals, then at step S907, the user's selections with regard to searching are received, and the process branches back to step S905 and the list is regenerated according to the user's search criteria. If, alternatively, the determination at step S906 is that the user is not desiring to search for a particular private time off grants, then a determination is made at step S908 whether the user desires to delete a particular granting of private time off. If so, then the user is prompted to confirm whether to delete the private time off granting (step S909).

Thereafter, if the user confirms, then a particular private time off granting is deleted in step S910. Alternatively, the process branches back to step S905. Alternatively, if the user elects in step S908 not to delete private time off, then the process branches to step S911. If the determination in step S904 is that the user did not select an option to view the approved private time off, then the process preferably branches to step S912, and a determination of whether a user has selected an option to review a list of unapproved private time off. If so, then at step S913, a list of unapproved private time off is preferably generated and provided for the user. Similar to the steps associated with listing approved private time off, at steps S914-S921, the user is afforded an opportunity to search and/or delete unapproved private time off. Unlike the steps associated with approved private time off, however, at step S919, a user has an opportunity to approve private time off that might have otherwise been unapproved. If so, at step S920, a respective unapproved private time off is approved and the process branches thereafter to S913. If, however, the user at step S919 elects not to approve previously unapproved private time off, then at step S921, the process ends.

If the determination at step S912 is that the user has not selected an option for a list of unapproved private time off, then a determination is made at step S922 whether the user has selected an option to grant a private time off request. If so, then the process branches to step S923 and private time off information is preferably added by the user and received by system 100. Thereafter, at step S924, a determination is made whether the information submitted by the user is valid and, if not, then the process branches back to S923. If the information submitted in step S923 is valid, then the process branches to step S925 and the new information is preferably added. Thereafter, the process branches back to step S903 and user options are preferably received. Further, the new information submitted by the user in step S923 is preferably stored in a database (step S926). Alternatively, if system 100 determines at step S922 that the user has not selected an option to grant private time off, then the process associated with steps S900 preferably ends at step S927.

Figure 12:
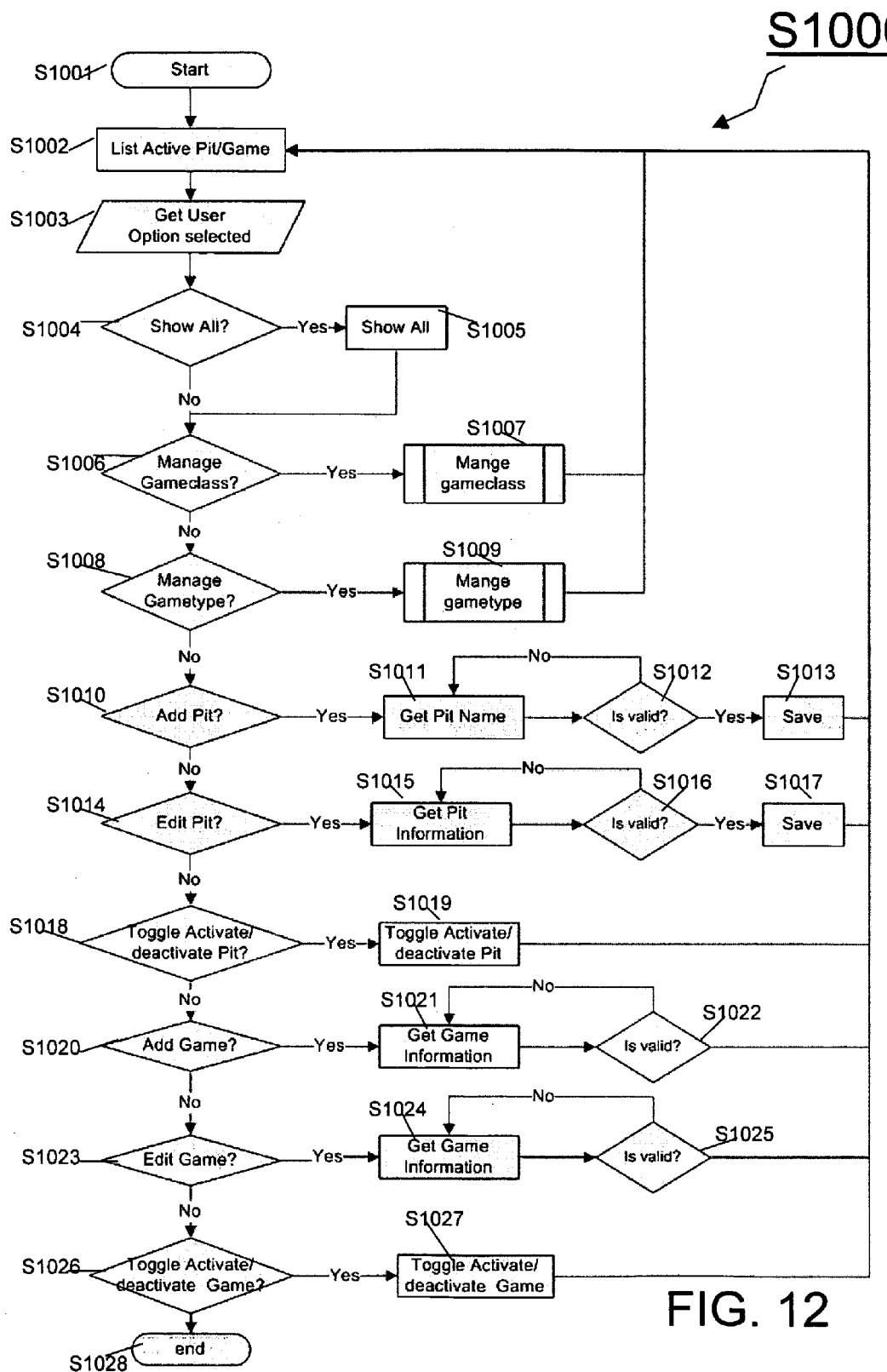

FIG. 12 is a flowchart illustrating steps S1000 associated with features provided to a user that system 100 has determined desires to set up a game in accordance with a preferred embodiment of the present invention. At step S1001, the process starts, and in step S1002, options associated with active game pits and/or games are preferably listed for a user to select. At step S1003, a user makes a selection and system 100 receives that selection. At step S1004, a determination is made whether the user has made a selection to show all pits and/or games in a respective establishment. If so, then at step S1005, all of the pits and/or games are displayed. If not, then the process branches to step S1006 and a determination is made whether a user has selected an option to manage a particular game class. As used herein, a game class preferably relates to a respective category or quality of game such as, for example, card games, dice games or other types of games of chance. In the event in step S1006 system 100 has determined that the user has selected an option to manage a game class, then the process branches to step S1007 and options are provided for a user to manage game classes. For example, a user may enter a new type of game class, may change a name of a game class or the like. Thereafter, the process branches back to step S1002. If the determination in step S1008 is that the user has not selected an option to manage a game type, then the process branches to step S1010 and a determination is made whether a user has selected an option to add a new game pit. If so, then the process branches to step S1011 and an identifier of a new pit, such as a new pit name, is preferably received from the user. At step S1012, a determination is made whether the information received in step S1011 is valid. If not, then the process branches back to S1011. If so, then the process branches to step S1013 and the new game or other identifier is preferably saved. Thereafter, the process loops back to step S1002. If, alternatively, the determination at step S1010 is that the user does not elect to add a new pit, then a determination is made at step S1014 whether the user has selected an option to edit a pit.

At step S1015, pit information is preferably received, for example, from a database, and presented to the user for editing. After the user makes editing revisions to existing pit information, a determination is made in step S1016 whether the revisions are valid. If not, then the process branches back to S1015. If so, then the process branches to step S1017, the revisions are saved and process continues and loops back to step S1002. If the determination in step S1014 is that the user has not selected an option to edit information related to a pit, then the process branches to step S1018 and a determination is made whether the user has selected an option to activate or deactivate a particular pit. If so, then the process branches to step S1019 and the user toggles between activating and deactivating a pit. Thereafter, the process loops back to step S102. In the event that the determination in step S1018 is that the user did not select an option to toggle between activating and deactivating a pit, then the process branches to step S1020 and a determination is made whether a user desires to add a new game to an establishment. If so, then the process branches to step S1021 and game information regarding the new game to be added is preferably received from the user. At step S1022, a determination is made whether the new information is valid. If not, then the process branches to step S1021 and, if it is valid, alternatively, the new information is saved and process loops back to S1002. Alternatively, if the determination in step S1020 is that the user does not select an option to add a new game, then a determination is made whether a user has selected an option to edit information regarding an existing game (step S1023). If so, then the process branches to step S1024 and information is preferably retrieved for a respective game and a user's edits or other modifications to the game information is preferably received. Thereafter, the process branches to step S1025 and a determination is made whether the information received from the user regarding the game information edit is valid. If so, then the information is preferably saved and the process branches back to step S102. If the information is not valid, then the process branches back to step S1024. If, alternatively, the determination in step S1023 is that the user does not select an option to edit information with respect to a game, then the process branches to step S1026 and a determination is made whether the user desires to toggle between activating and deactivating a game. If the user does select an option to activate or deactivate a game, then the process branches to step S1027 and the user is provided with graphical screen controls, for example, drop-down lists, to activate or deactivate a respective game. Thereafter, the user's selections are saved and the process branches back to step S102. If the determination in step S1026 is that the user does not select an option to activate or deactivate a game, then the process associated with steps S1000 preferably ends.

Figure 13:
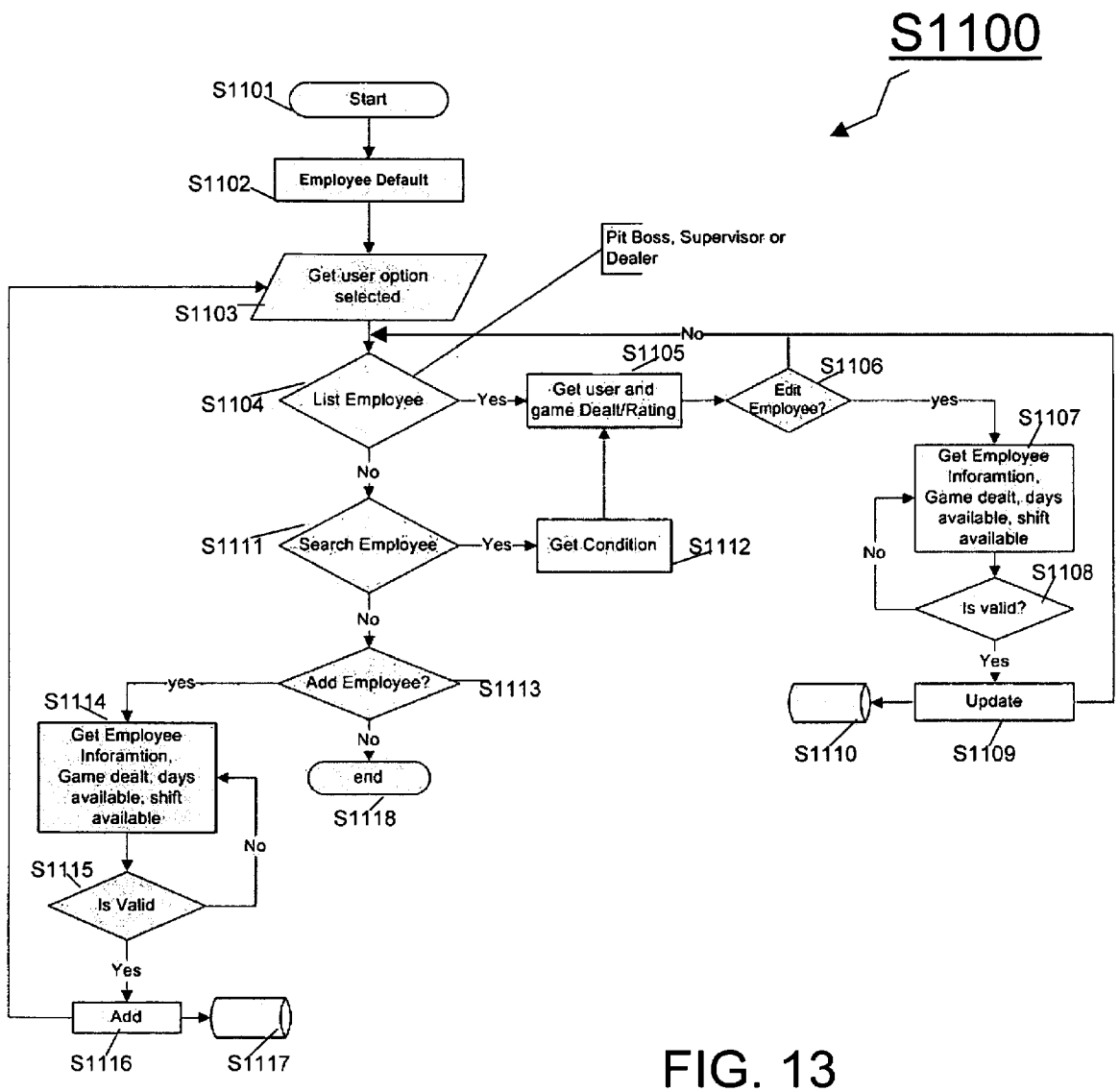

FIG. 13 is a flowchart that illustrates steps S1100 associated with features provided to a user that system 100 has determined has selected options associated with setting up employee information or otherwise managing employee data. The process starts at step S1101, and at step S1102, options are preferably provided for the user to select with regard to employee data set up or other management features. At step S1103, a user's selection is preferably made and received by system 100. Thereafter, the process branches to step S1104 and a determination is made whether the user has selected an option to review a list of employees that are currently stored in system 100. Thereafter, the process branches to step S1105 and information regarding an employee is preferably received for employees including, employee ratings, employee skill sets, employee table history or the like. Thereafter, this process branches to step S1106 and a determination is made whether the user has selected an option to edit information regarding a respective employee. If so, then the process branches to step S1107 and information regarding the employee is preferably edited by the user such as, for example, the employee's skill set, days that the employee is available, shifts that an employee is available or the like. The process continues to step S1108 and a determination is made whether the information submitted by the user is valid and, if not, then the process branches back to step S1107. If the information received from the user is valid, then the process branches to step S1109 and the employee information is preferably updated and, at step S1110, saved. Thereafter, the process preferably loops back to step S1104. If, alternatively, the determination in step S1104 is that the user does not select an option to list employees that are stored in the database, then at step S1111, a determination is made whether the user has selected an option to search for a particular employee. If so, then search criteria or conditions are preferably received from the user (step S1112). Thereafter, the process loops back to step S1105. If, alternatively, the user has not selected an option to search for a respective employee in step S1111, then the process preferably branches to step S1113 and a determination is made whether the user has selected an option to add an employee. If so, then the process branches to step S1114 and the user submits information regarding an employee, for example, the type of game that the employee is trained in, days that the employee is available, shifts that the employee is available or the like. Thereafter, at step S1115, a determination is made whether the information submitted by the user is valid and, if not, the process branches back to step S1114. If the information submitted by the user is valid, then the process branches to step S1116 and the new employee information is preferably added and stored (step S1117). Thereafter, the process branches back to step S1103. If the determination in S1113 is that the user has not selected an option to add a new employee, then the process preferably branches to step S1118 and the process associated with steps S1100 preferably ends.

Figure 14:
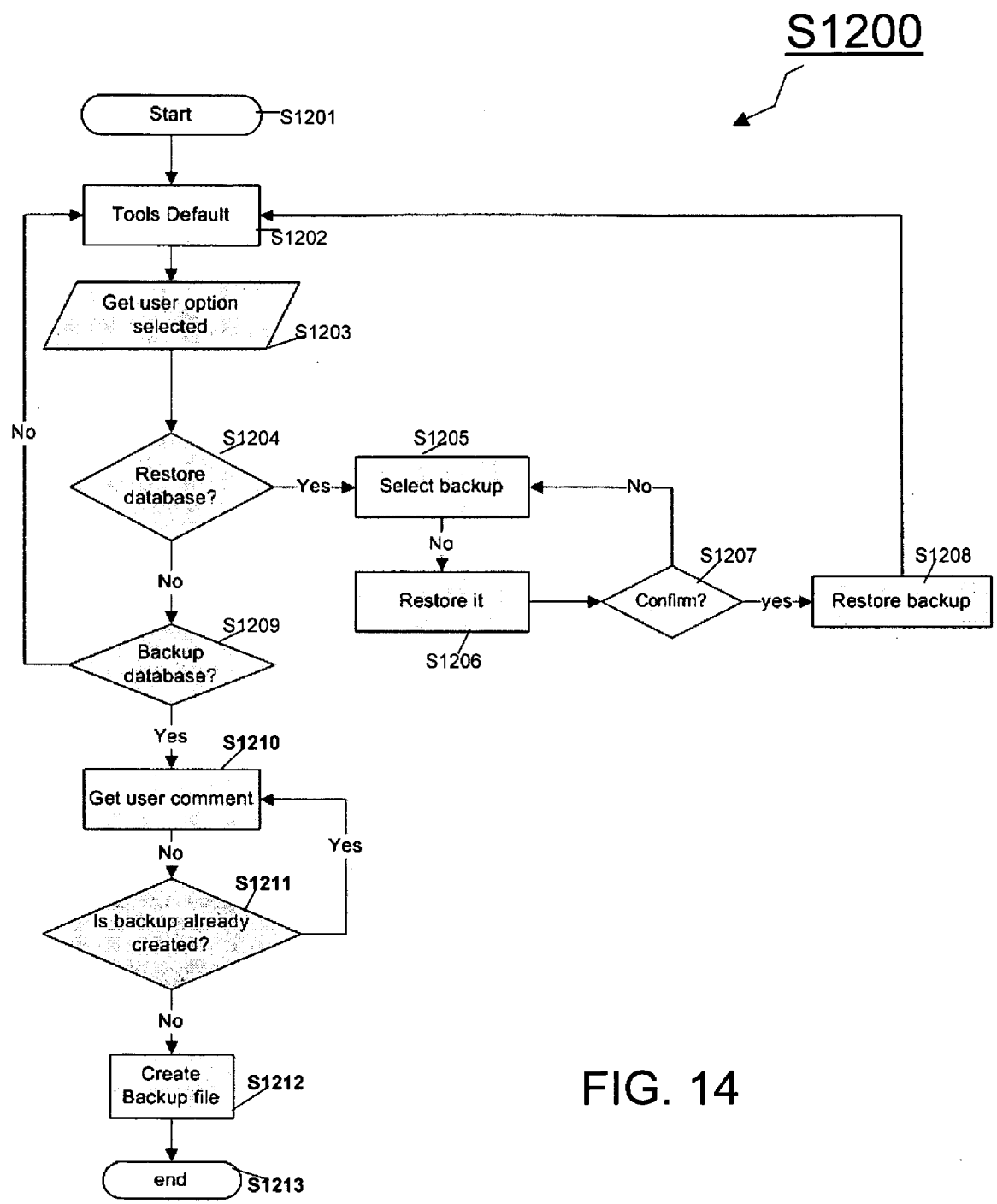
FIG. 14 is a flowchart illustrating steps associated with data management in accordance with an example embodiment.

FIG. 14 is a flowchart illustrating steps S1200 that are associated with data management and other data tools are provided in accordance with a preferred embodiment of the present invention. The process starts at S1201 and at step S1202, options are preferably provided for the user to select with regard to data management. At step S1203, the user makes a selection and that selection is preferably received by system 100. At step S1204, a determination is made whether the user has selected an option to restore a database. If so, then the process branches to step S1205 and a respective backup set, as known in the art, is preferably selected by the user. Thereafter, the user selects an option to restore the selected backup (step S1206) and at step S1207, a determination is made whether the user has confirmed that he wants to restore the selected backup set. If not, then the process branches back to step S1205. Alternatively, if the user does confirm in step S1207, then at step S1208, the backup set is restored and the process branches back to step S1202. If, alternatively, the determination in step S1204 is that the user does not select an option to restore a database, then a determination is made at step S1209 whether the user has selected an option to backup a database. If not, then the process branches back to step S1202. Alternatively, if the determination is made in step S1209 that the user had selected an option to backup the database, then the process branches to step S1210 and a user comment is preferably received from the user that identifies the backup set in a particular way, for example, by submitting a date. Thereafter, a determination is made at step S1211 whether or not a backup set has already been created that includes the same user comment and, if so, the process branches back to step S1210. If not, then the process branches to step S1212 and the backup file is preferably created. Thereafter, the process associated with steps S1200 preferably ends at step S1213.

Figure 15:
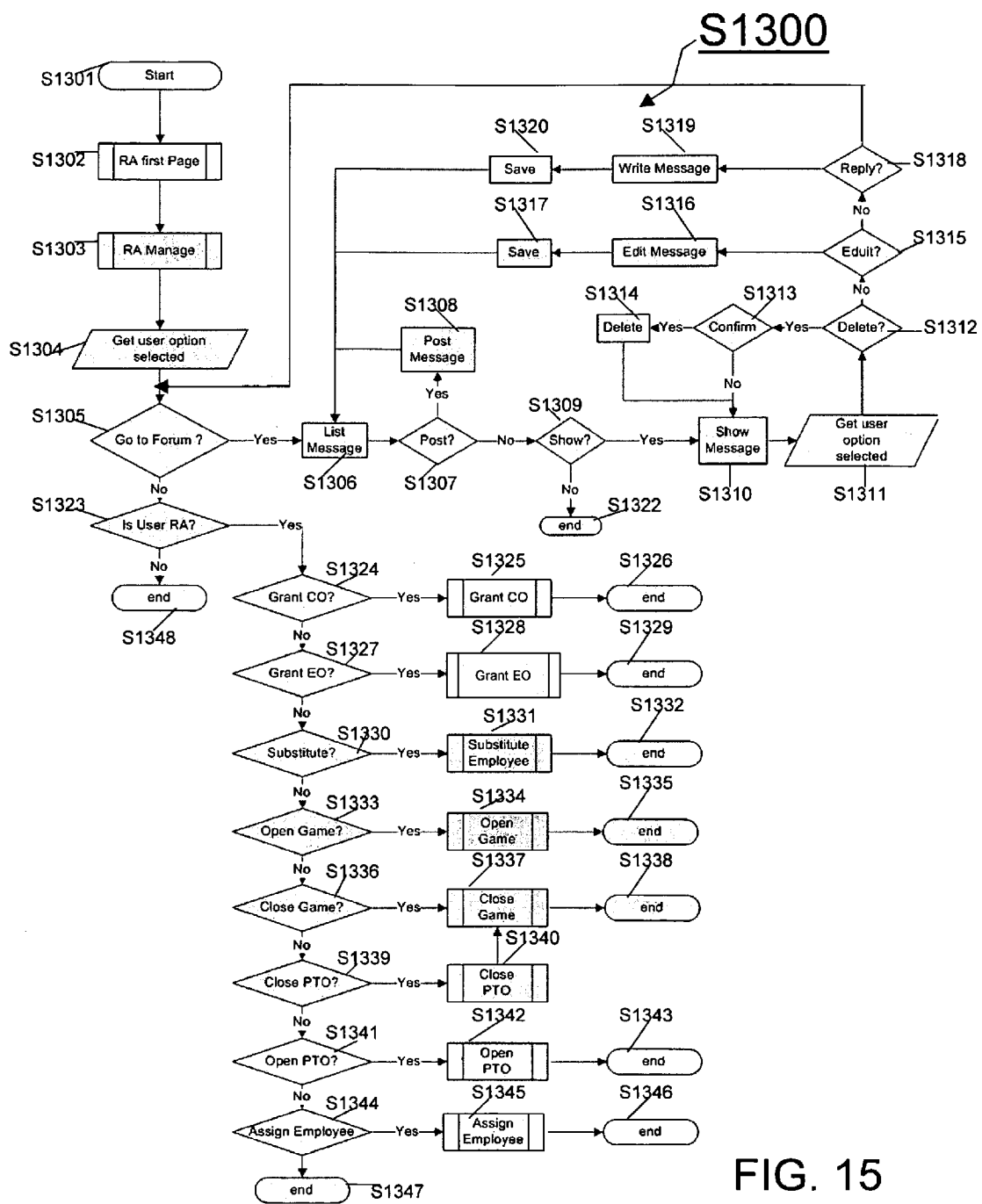
FIG. 15 is a flowchart illustrating steps associated with options afforded to a roadmap administrator, in accordance with an example embodiment.

FIG. 15 is a flowchart that represents steps S1300 associated with options provided for a roadmap administrator in accordance with a preferred embodiment of the present invention. At step S1301, the process starts, and at step S1302, options are preferably provided for the roadmap administrator to select in accordance with a preferred embodiment. For example, the roadmap administrator uses the features provided in steps S1300 to communicate with other users over a messaging forum, grant, callout time, early out, substitute employees, open and closed games, open and closed private time off, grants, and assign employees to various tasks. At step S1303, the roadmap administrator preferably makes a selection and at step S1304, the selection is received by system 100. Thereafter, at step S1305, a determination is made whether the user has selected an option to communicate to other users over a networked communication forum, such as a messaging post forum, as known in the art. Thereafter, at step S1307, a determination is made whether a message has been posted by the user, and, if so, then the message is preferably posted at step S1308, and the process loops back to step S1306.

Alternatively, if the determination in step S1307 is that no message has been posted then, a determination is made whether a message should be shown may have been transmitted by another user (step S1309). If so, then the message is preferably shown in step S1310 and, at step S1311, user options associated with a message are preferably displayed for the user to select. Thereafter, the process branches to step S1312 and a determination is made whether the user has selected an option to delete a selected message (step S1312). If so, then the process branches to step S1313 and another determination is made whether the user has confirmed to delete the message. If so, then at step S1314, the message is deleted and the process branches back to step S1310. If not, the message is not deleted and the process branches back to step S1310. If, alternatively, the determination in step S1312 is that the user does not select an option to delete the message, then an option is provided and a determination is made at step S1315 whether the user elects to edit or otherwise change the message. If so, then the process branches to step S1316 and the user is provided an opportunity to edit the message and, thereafter, the process continues to step S1317 and the message is preferably saved. Thereafter, the process branches back to step S1305.

Alternatively, if in the determination at step S1315 that the user has elected not to edit the message, then a determination is made at step S1318 whether to reply to the message that was received from another user. If so, then the process branches to step S1319 and the user is prompted to write a message and thereafter to save the message at step S1320. Thereafter, the process branches back to step S1306. Alternatively, if the determination at step S1318 is that the user does not select an option to reply to the message, then the process branches back to step S1305. If, alternatively, at step S1305, a determination is made that the user does not select an option to go to a communication forum, then a determination is made whether the user is a roadmap administrator at step S1323. If so, then the roadmap administrator is provided with a series of options. At step S1324, for example, a determination is made whether the user has selected an option to grant a callout time. If so, then the process branches to step S1325, the callout is granted and the process ends at step S1326. If the determination at step S1324 is that the user does not select an option to grant a callout, then the process branches to step S1327 and then a determination is made whether the user has selected an option to grant an early out. If so, then the process branches to step S1328 and the user grants an early out at step S1328 and the process preferably ends at step S1329. Alternatively, if the determination is at step S1327 that the user has not selected an option to grant an early out, then the process branches to step S1330 and a determination is made whether the user has selected an option to substitute an employee with another employee. If so, then the process branches to step S1331 and options are provided for the user to select in order to substitute an employee with another employee.

Thereafter, the process ends at step S1332. Alternatively, if the determination at step S1330 is that the user has not selected an option to substitute an employee, then the process branches to step S1333 and the determination is made whether a user has selected an option to open a game. If so, then the process branches to step S1334 and the game is open. Thereafter, the process ends at step S1335. Alternatively, if the determination at step S1333 is that the user has not selected an option to open a game, then a determination is made whether the user has selected an option to close a game (as in step S1336). Thereafter, the process branches to step S1337 and the user selects an option to close a game. Thereafter, the process terminates at step S1338. Alternatively, if the determination at step S1336 is that the user has not made a selection to close a game, then a determination is made at steps S1339 and S1341 whether to grant or allow a private time off request. At steps S1340 and S1342, if the determinations at steps S1339 and S1341 are that the user has selected options to deny private time off or grant private time off, respectively, then a process branches to steps S1340 or S1342, respectively in order to close or grant private time off. If the user selects an option to grant private time off, then the process preferably terminates at step S1343.

Alternatively, if the determination at step S1341 is that the user has not an option to grant private time off, then a determination is made at step S1344 whether the user has selected an option to assign an employee to a particular table and/or task. If so, then the process branches to step S1345 and the user assigns an employee to a respective table or other task and thereafter, the process terminates at step S1346. Alternatively, if the determination at step S1344 is that the user has not selected an option to assign an employee to a respective task, then the process preferably terminates at step S1347.

Thus, as shown and described with reference to the flow-charts of FIGS. 3-15, the present invention provides tremendous flexibility for users to schedule shifts, work load, employee performances and enter and review data essential for decision making. An innovative web-based human resource and dynamic space allocation management tool is provided that enables users to schedule work shifts, work load, measure employee performances with convenient and intuitive retrieval of data that are essential for timely decision making. The systems and methods shown and described herein improve processes associated with defining and implementing shift details, as well as to evaluate and update a dealer's status and to track employee turnover. Accordingly, managers are provided with information needed to increase their overall effectiveness. Realizable benefits of practicing the systems and methods described herein include optimizing employee and establishment performance, and increasing profit.

In a preferred embodiment, data entry display screens are provided in a web-based application, which allows convenient and remote access. For example, employees can check respective work schedules from different places remotely, and managers are enabled to work in a mobile fashion. Further, preferably the application is provided in a multi layered system, thereby enabling users having different authorization are provided respective access levels, thereby restricting users from adding, editing or viewing data. Moreover, management can use the systems and methods described herein to assign personnel, as well as to make employment decisions (e.g., hiring, firing, promoting and demoting) via employee evaluations that are made possible using information provided herein. By reviewing employee performance, managers can justify termination of contract decisions.

FIGS. 16-27J illustrate an example display screens that are provided to a user in connection with a preferred embodiment of the present invention, and correspond with the flow charts shown in FIGS. 3-15.

Figure 16:
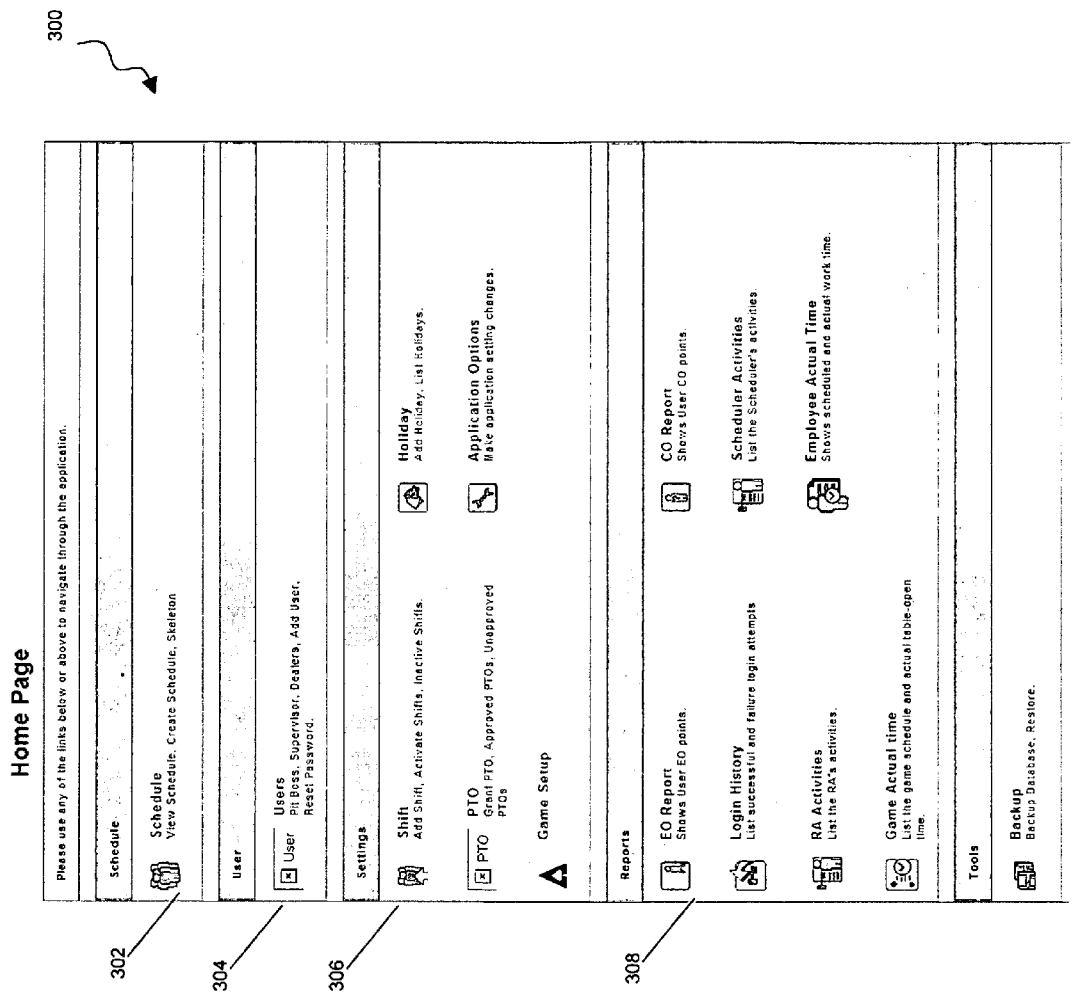

FIG. 16 illustrates example display screen 300 that includes modules that are preferably provided to a user who successfully logs into system 100. The user is preferably provided with options provided by schedule module 302, user settings module 304, RA settings module 306 and reports 308. Schedule module 302 enables users to schedule employee efficiently, enabling employees to remain fresh and without being over-worked, as well to avoid favoritism. Further, schedule module 302 enables employees to schedule weekly days off according to respective preference.

FIGS. 17-20 illustrate example display screens 400, 500, 600 and 700, which are provided for a user to enter data regarding employees and other users. Employee information can be added and managed for example, via importing data from an external data source, such as an MICROSOFT EXCEL file or other data source. As shown in FIG. 17, display screen 400 includes module 402 includes graphical screen controls for adding users, employees, and importing data from external data sources. Further, employee summary information section 404 includes statistical information, such as numbers of supervisors, dealers, full-time and part-time employees, and active and inactive personnel at a particular establishment. FIG. 18 illustrates example display screen 500 that includes summary information section 502 for a plurality of employees, including numbers relating to work hours per week, employment status (e.g., part time or full time) or the like.

Figure 19:
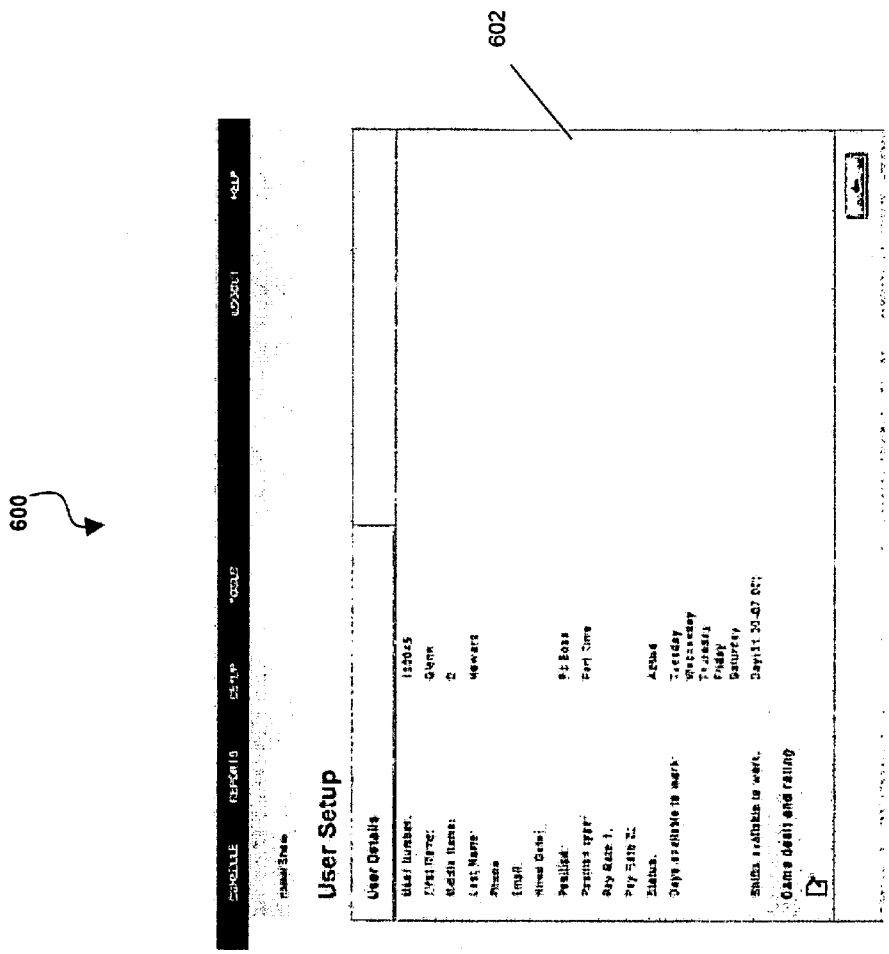
Figure 20:
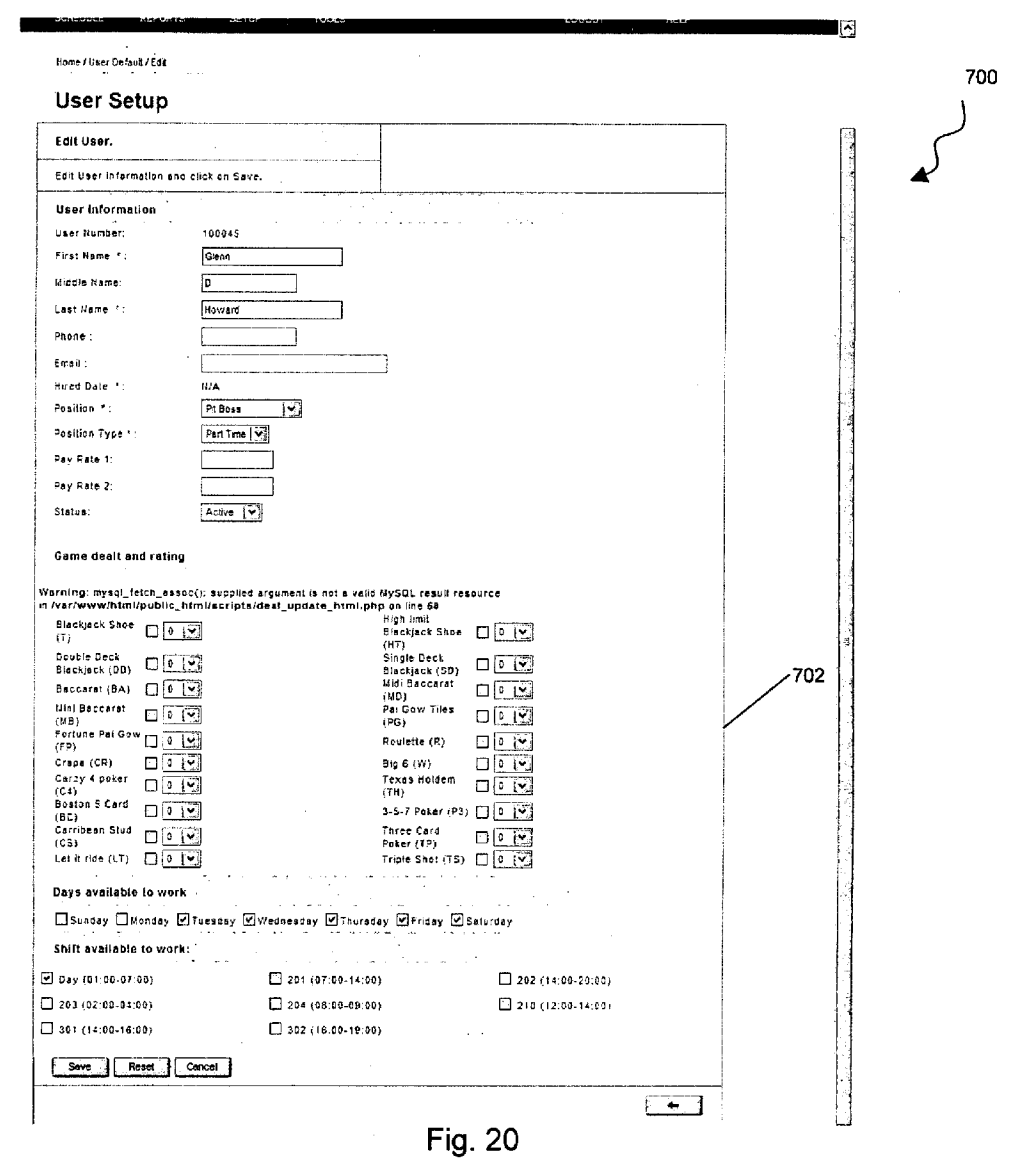

FIG. 19 illustrates example display screen 600 that includes employee shows summary information section 602 for a dealer, and includes, for example, demographic information, and employment information, including pay rates, days available for work, games dealt and rating information (FIG. 20). Other information provided by the user includes whether the employee is "full-time" (e.g., the employee works forty or more hours a week, each week) or "part-time" (e.g., the employee works on a contractual basis). Further the user submits particular days during a week when an employee is available for work. Many gaming establishments operate twenty-four hours per day, seven days a week ("24/7"), and the information submitted in data entry display screen 700 is used for scheduling workers according to availability. Moreover, data entry controls are provided in section 702 for defining a shift that a employee is available to work. For example, a shift is specified when an employee is available for work. As many gaming establishments operate 24/7, some employee may prefer to work nights and some during the day. Other data-related functionality is provided, for example to assist with scheduling or reviewing information related to a particular shift, that includes modules to add an employee, list pit boss list supervisor(s), list dealer, search employee, edit employee, reset password, import employee data.

FIG. 20, for example, illustrates employee (e.g., dealer) rating section 700 provided for games dealt. As shown in FIG. 20, various games are listed for the user to select, as well as to assign ratings, ranging from minimum to maximum, for a respective employee. As noted herein, applying ratings to employees enables users to properly assign employees to respective tasks. For example, appropriate dealers are assigned to the respective tables and areas, thereby maximizing profit for the establishment.

FIGS. 21A-21D illustrate example display screen 800 that includes graphical screen controls associated with game setup module 802. Game setup module is preferably used for setting up a gaming establishment floor-plan that is operable to change dynamically over time. Preferably, game setup module 802 includes options to set up a pit, a game, a game type and a game class. Enabling a pit setup preferably enables a user to add/edit a pit, add/edit a game type, list or add/edit a game class, add/edit a game, display all (active/inactive) pits and games, activate an otherwise deactivated pit, deactivate an otherwise activated pit, activate an otherwise deactivated game, deactivate an otherwise activated game, arrange a pit, and/or arrange a game.

In an embodiment, to add a pit a user selects "Add Pit" option from main floating menu 804. Thereafter, the user enters a new pit name, selects whether the pit is active or inactive, and the selects an option to save the newly entered pit in a database for future assignments. The add a new game type, in an embodiment, a user preferably selects "Game Type" from main floating menu 804, thereafter selects an option for adding a new game type, enters a unique game identifier, such as a code, enters a game name, enters a dealer name (if desired and/or necessary), selects a second employee (e.g., "Relief"), if desired and/or necessary, select the game type status as active or inactive, and selects an option to save the game type in a database for further assignments. User-based selections using menu options are, accordingly, utilized by the teachings herein to assign values associate with pit setup, game setup, game type setup and game class setup.

Figure 21A:
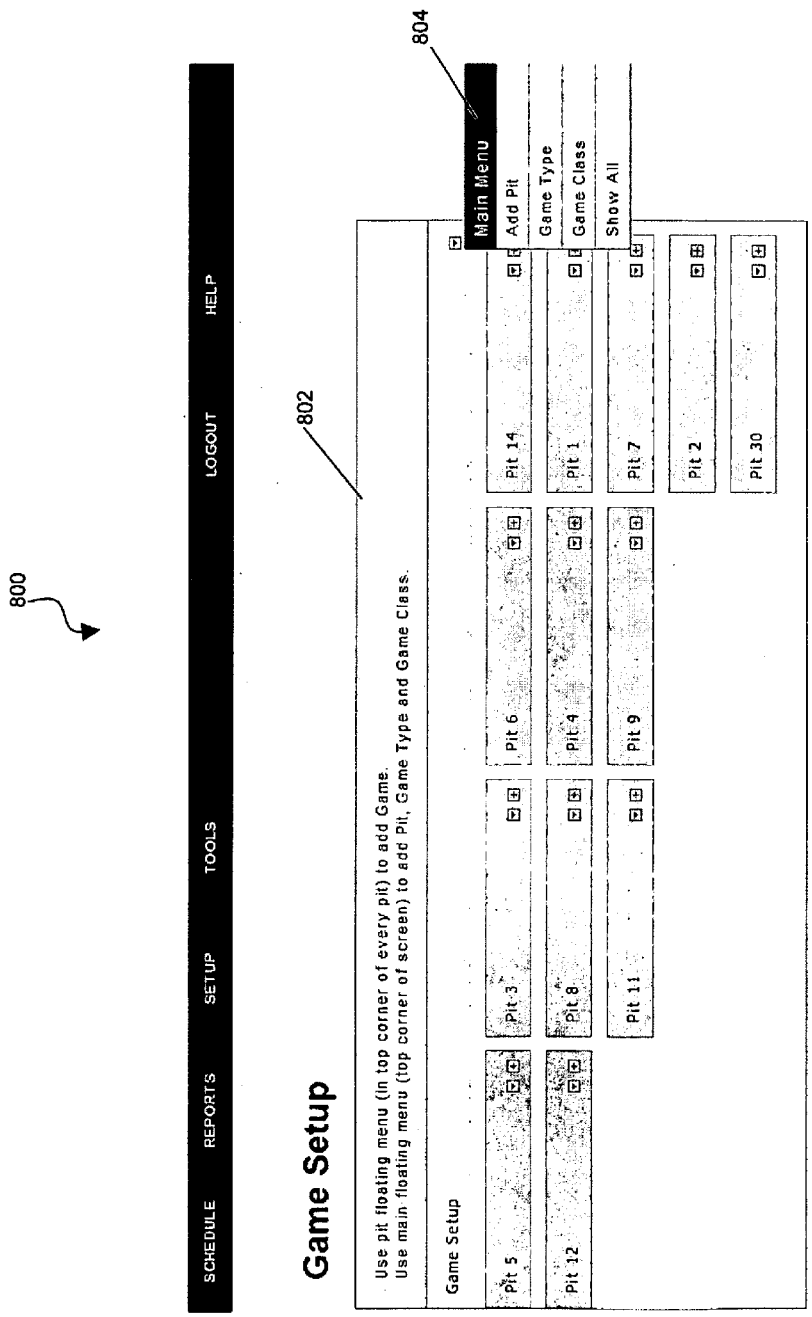
Figure 21B:
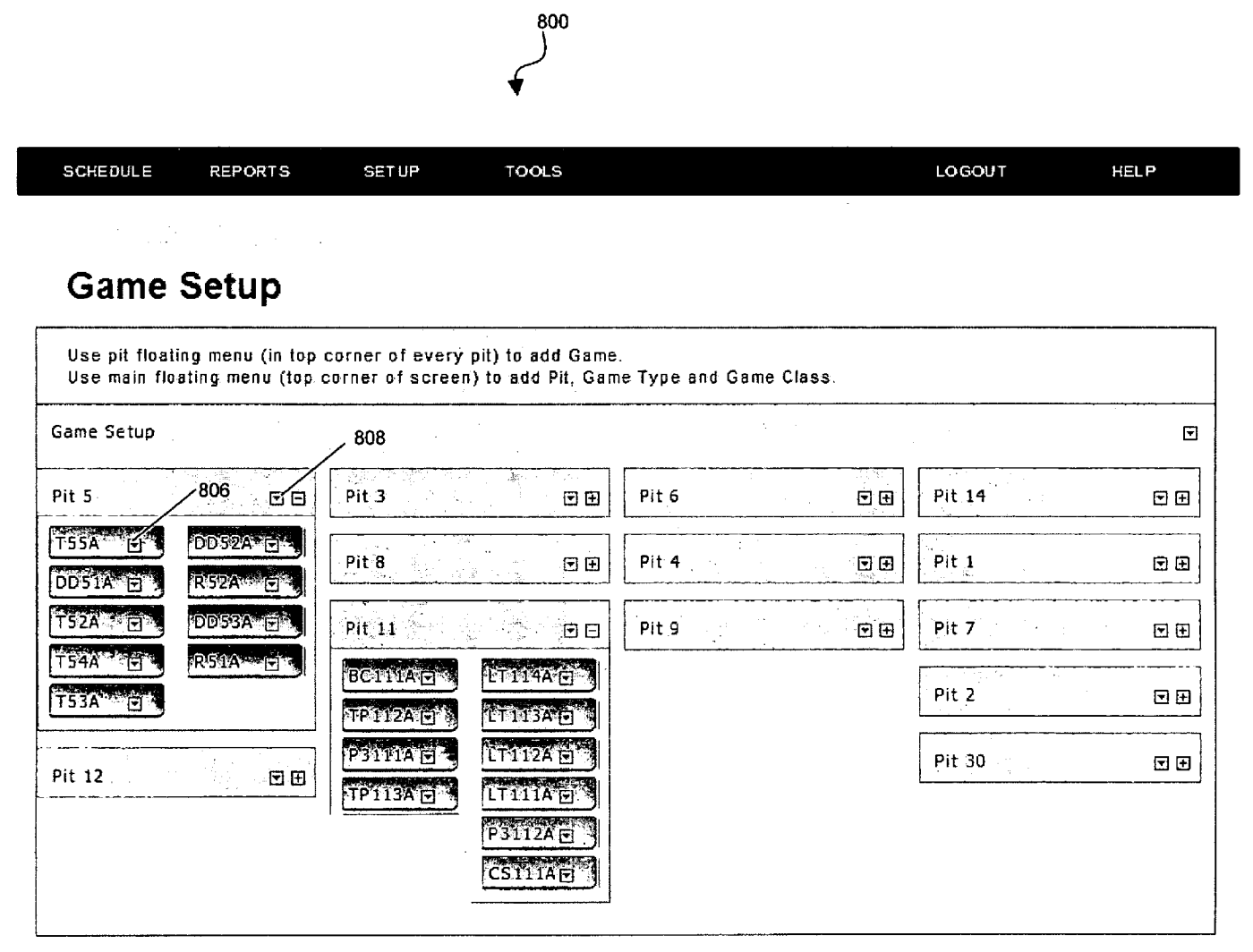
Figure 21C:
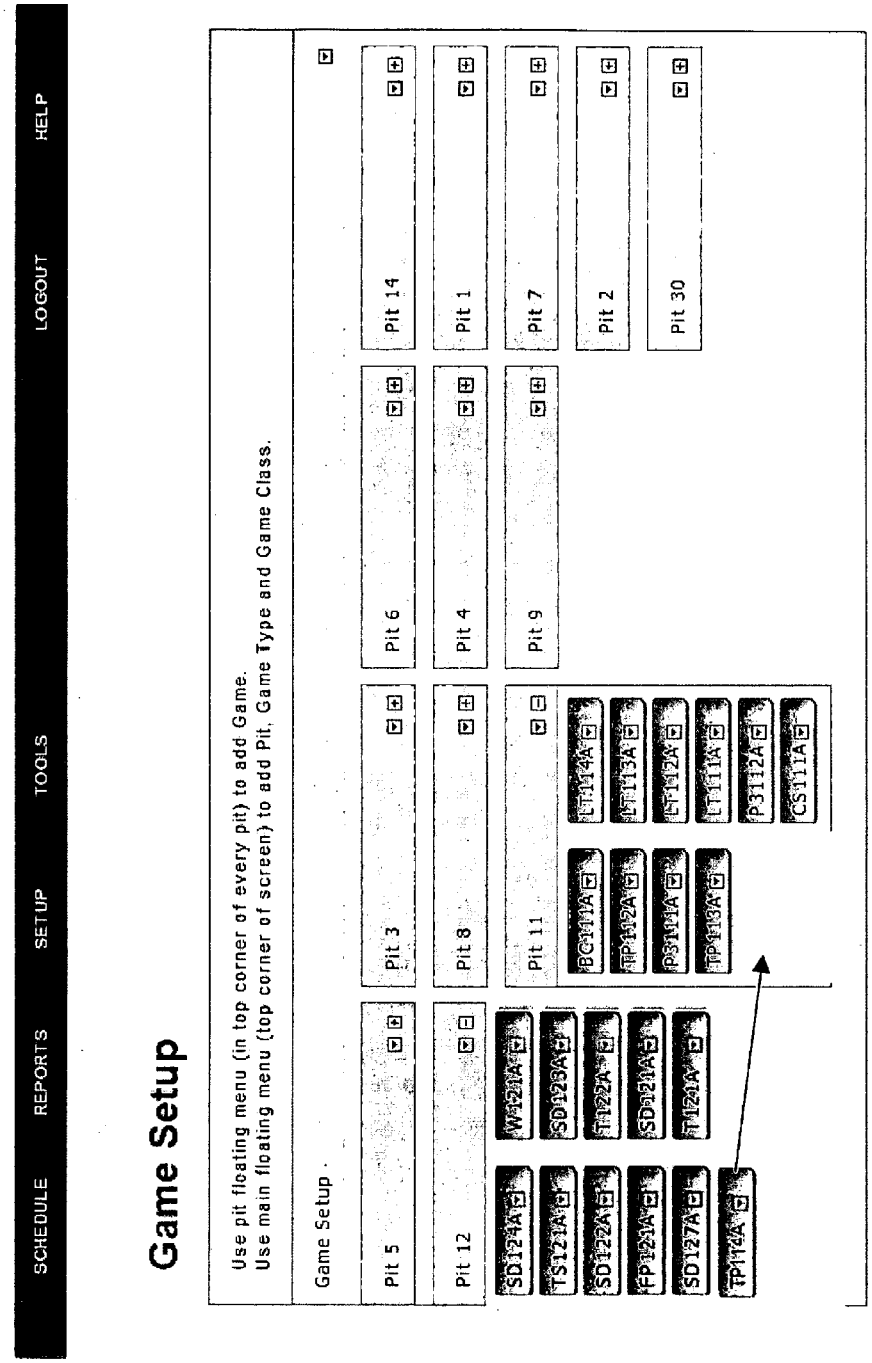
Figure 21D:

In addition to menu selections, convenient drag and drop functionality is provided for performing many of the functions and benefits described herein. For example, in the highlighted game TP114A which, as shown in FIGS. 21C-21D, is moved from Pit 12 to Pit 11.

In a preferred embodiment, users can view expanded or collapsed graphical representations of pits by selecting expand/collapse button to toggle a pit's respective display. Further, using a mouse or other selection device, a user can implement drag and drop features to move pits around, assign or move different games around one or more pits, or the like. Preferably, a pit menu option is displayed when a user selects pit menu icon 806 located at the top right corner of every represented pit. When selected, a menu preferably appears that includes choices enabling a user to add a game to a pit, edit pit information, and activate/deactivate a pit.

Similarly, game menu option is displayed when a user selects a game menu icon 808 located at the top right corner of every represented game. For example, and as shown in FIG. 21B, when icon 808 is selected, a menu is preferably presented that enables the user to edit game information, activate/deactivate game, and to set a game's status to either Active or Inactive. In a preferred embodiment, a specific naming convention for games is applied for convenient and concise display of a significant amount of information. Preferably, when a user adds a new pit, game, table or the like, information regarding the new entry is stored and identifiers are automatically generated. Then, when a game is added to a pit, a table name is automatically generated using a naming convention that includes: game_code+pit+table_no+class. For example a black jack ("BJ") on pit 5, having a class value of A and table number of 01 will be displayed as "BJ501A."

Figure 22:
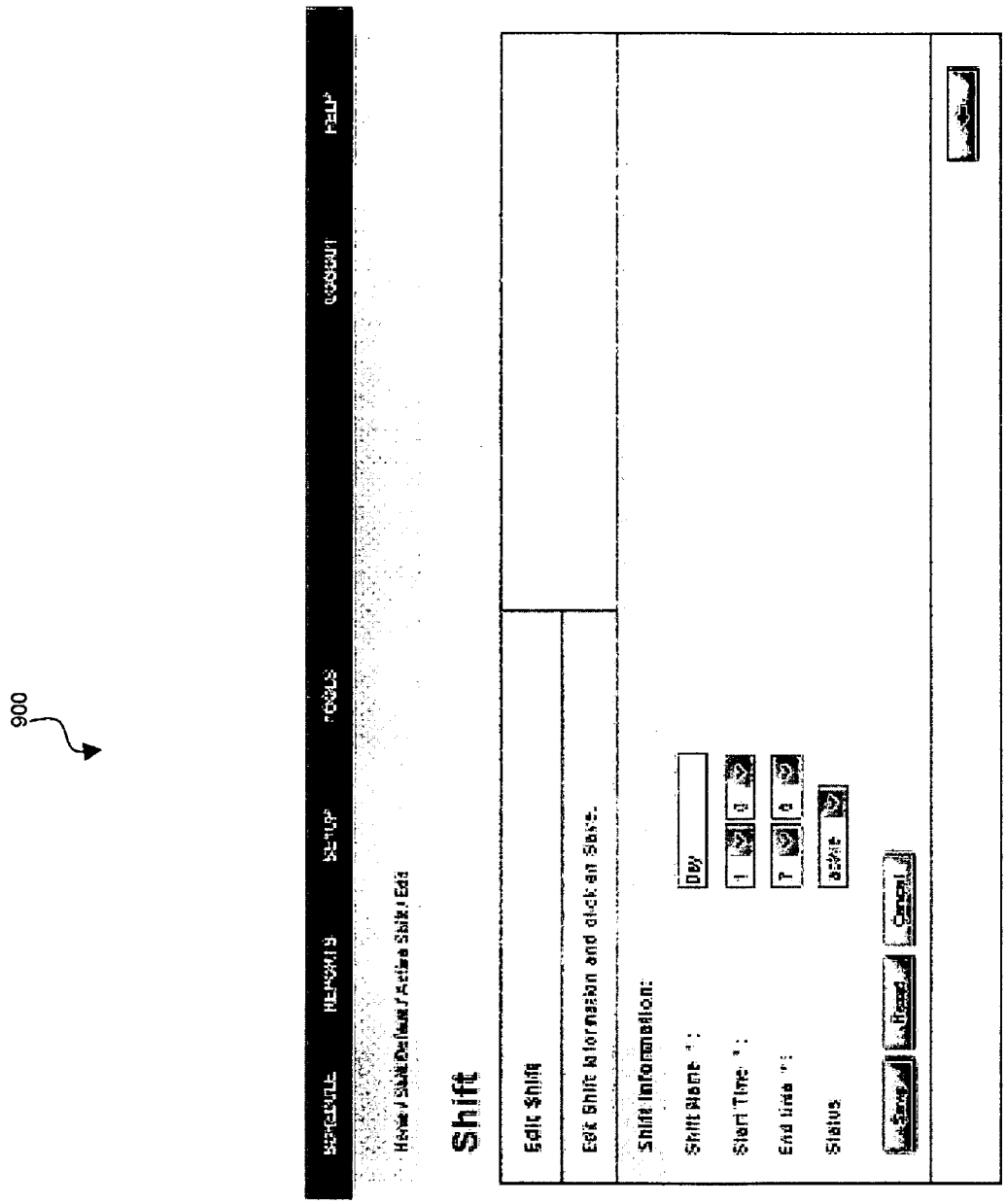

FIG. 22 illustrates an example data entry display screen 900 that is provided for user to add and edit an employee shift. As used herein, a "shift" refers to an employee's working hours. Days are preferably divided into multiple shifts, as required by a particular establishment, such as to functionally operate 24/7. As shown in FIG. 22, shift names are assigned and are defined in connection with a start time and an end time. Further, a status value (e.g., active or inactive) is defined in display screen 900. FIG. 23 illustrates an example display screen showing a list of active shifts. By selecting an icon under the "Action" column, a user can modify details regarding a respective shift, such as by making revisions to values in display screen 1000 (FIG. 22).

Figure 24:
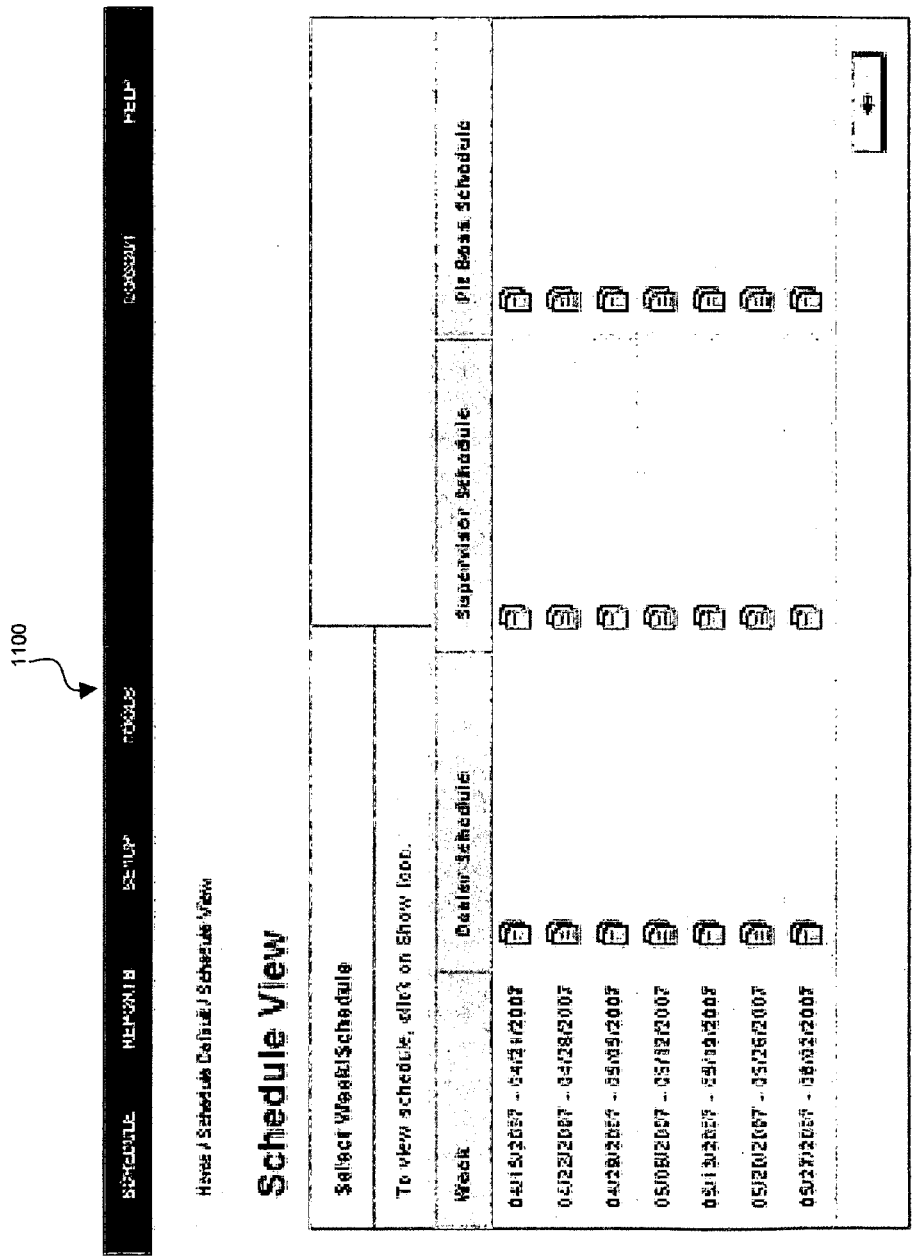
Figure 26A:
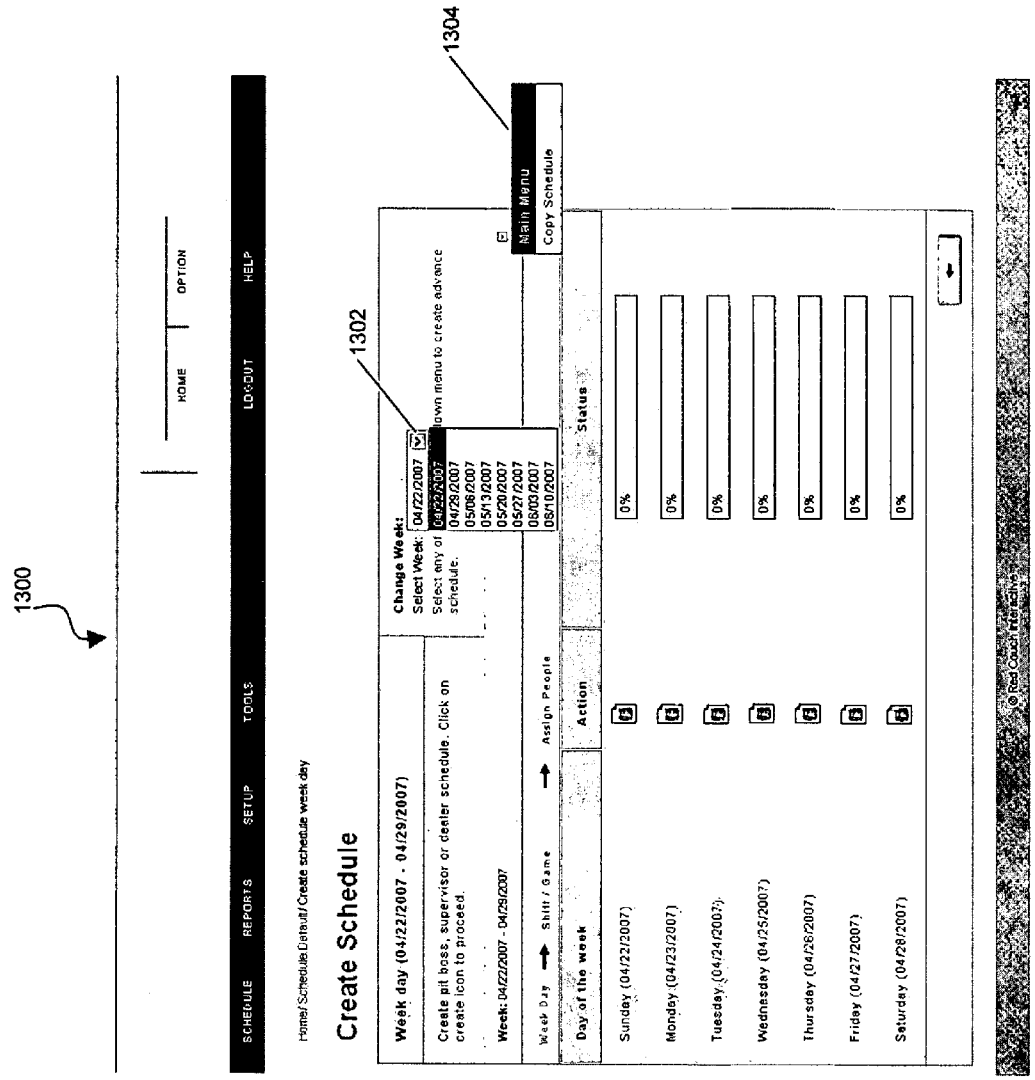

FIGS. 24-26 illustrate example scheduling options for a user relating to scheduling employees. As shown in FIG. 24, example display screen 1100 includes view/edit options for a list of schedules, ordered by weeks. FIG. 25 shows example display screen 1200 that shows a list of schedules, ordered by employee. An example create schedule display screen 1300 is shown in FIG. 26A. Each of the display screens preferably include graphical screen controls for adding and/or editing schedules.

Referring now to FIG. 26A, in a preferred embodiment a user initially creates a schedule for an employee using graphical screen controls shown in example display screen 1300. For example, a user selects a week from a drop down menu 1300. In one embodiment, a user creates schedule manually, or copies a previous schedule, such as a shift, day or week schedule. In one embodiment, a user copies a previous schedule by accessing a previous schedule, such as the weekly schedule shown in display screen 1300 and, thereafter selects a particular week from drop down list 1302, and then selects "Copy Schedule" from Menu 1304.

Figure 26B:
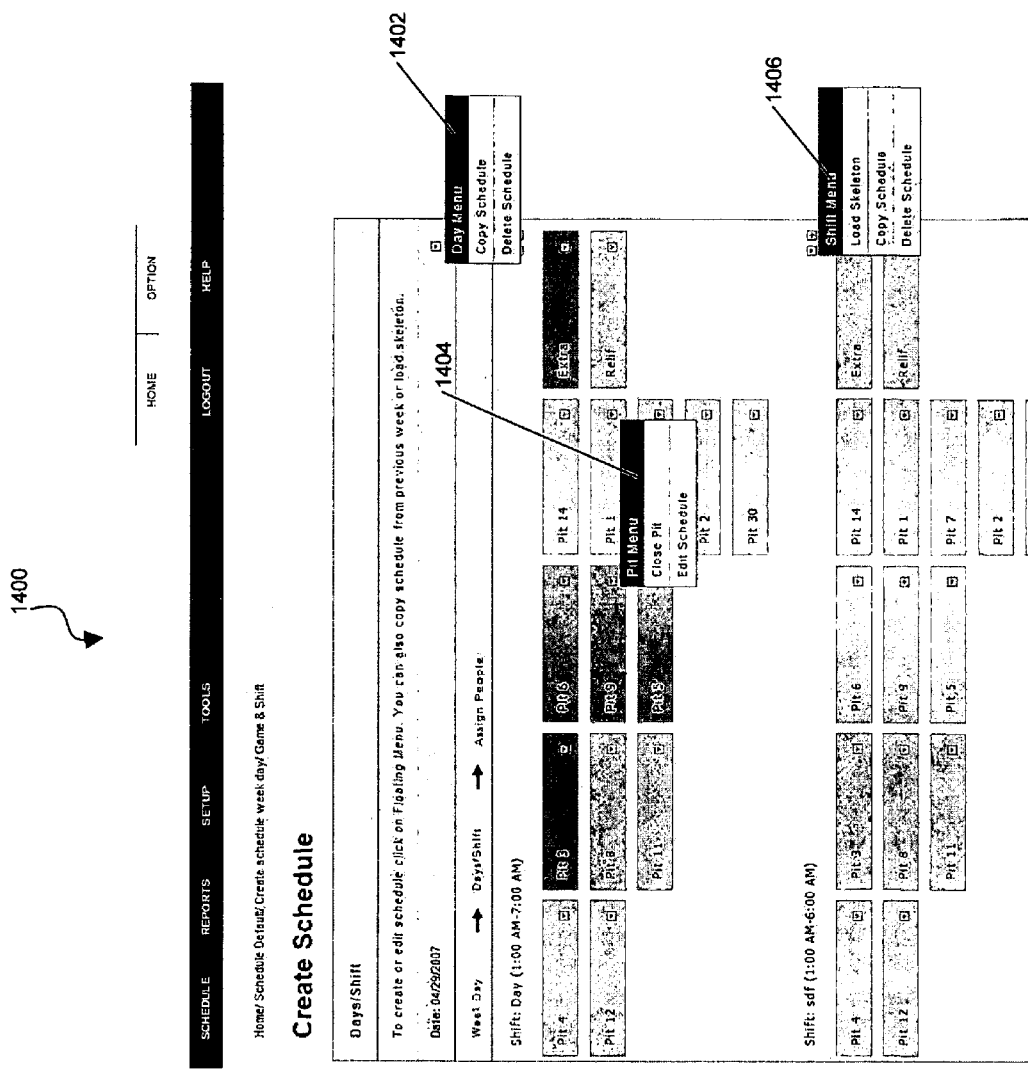

Referring now to example display screen 1400 shown in FIG. 26B, a user can define a day or shift schedule in connection with a particular pit. For example, a user copies a schedule or creates one, manually. The user can select from menu 1402 to select a daily schedule copy or a shift copy. Once copied, the user can refine a copied schedule, such as by deleting a portion (e.g., a shift) or adding to the schedule. Moreover, using pit menu 1404, the user preferably selects an option to close a pit, or open a pit and, thereafter, assign a schedule therefor. Another option for the user is to select an option from shift menu 1406 and load a skeleton schedule, copy a schedule or delete a schedule. Further, scheduled relief (additional employees) can be defined, as necessary depending upon, for example, a respective pit, area, time and day.

Figure 26C:
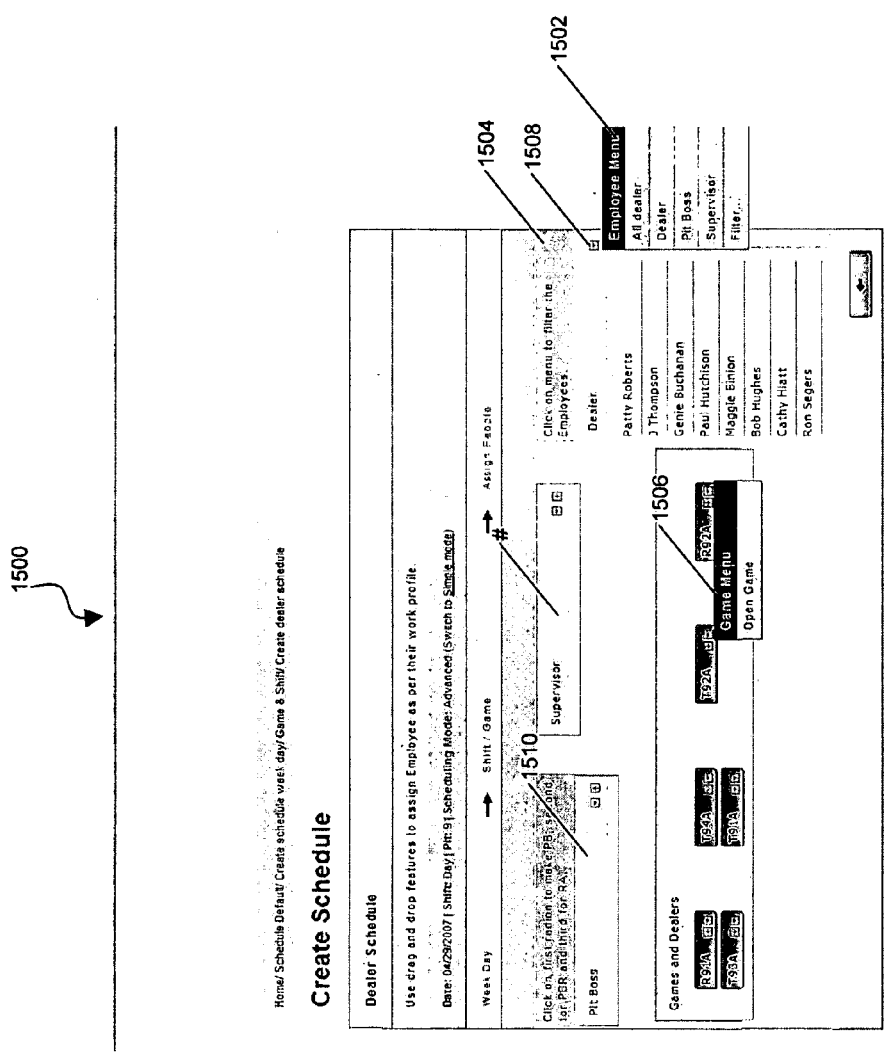

In addition to scheduling dates, a user can assign employees, dealers, pit bosses, supervisors or filter therefor using example display screen 1500, shown in FIG. 26C. For example, a user assigns a pit boss (or RA) by selecting a pit boss from employee menu 1502, by selecting icon 1504 and selecting a respective employee. Also, a user can select options from game menu 1506 to open a game for a respective scheduled location and time. Moreover, icon 1508 enables a user to drag a name of a pit boss into the pit boss area 1510. The user can, thereafter, further define the pit boss's role (e.g., PB., PBR. and RA.) (not shown). Using the convenient user interface, the user can further drag an employee back to the employee area from pit boss area 1510 to remove him/her from scheduling. Similar functionality is preferably provided for assigning supervisors and dealers. Thus, using the graphical screen controls and selecting various options to schedule, define and associate parties with particular locations and tasks, a week (or other timeframe) of scheduling is easily defined by a user.

Figure 27A:
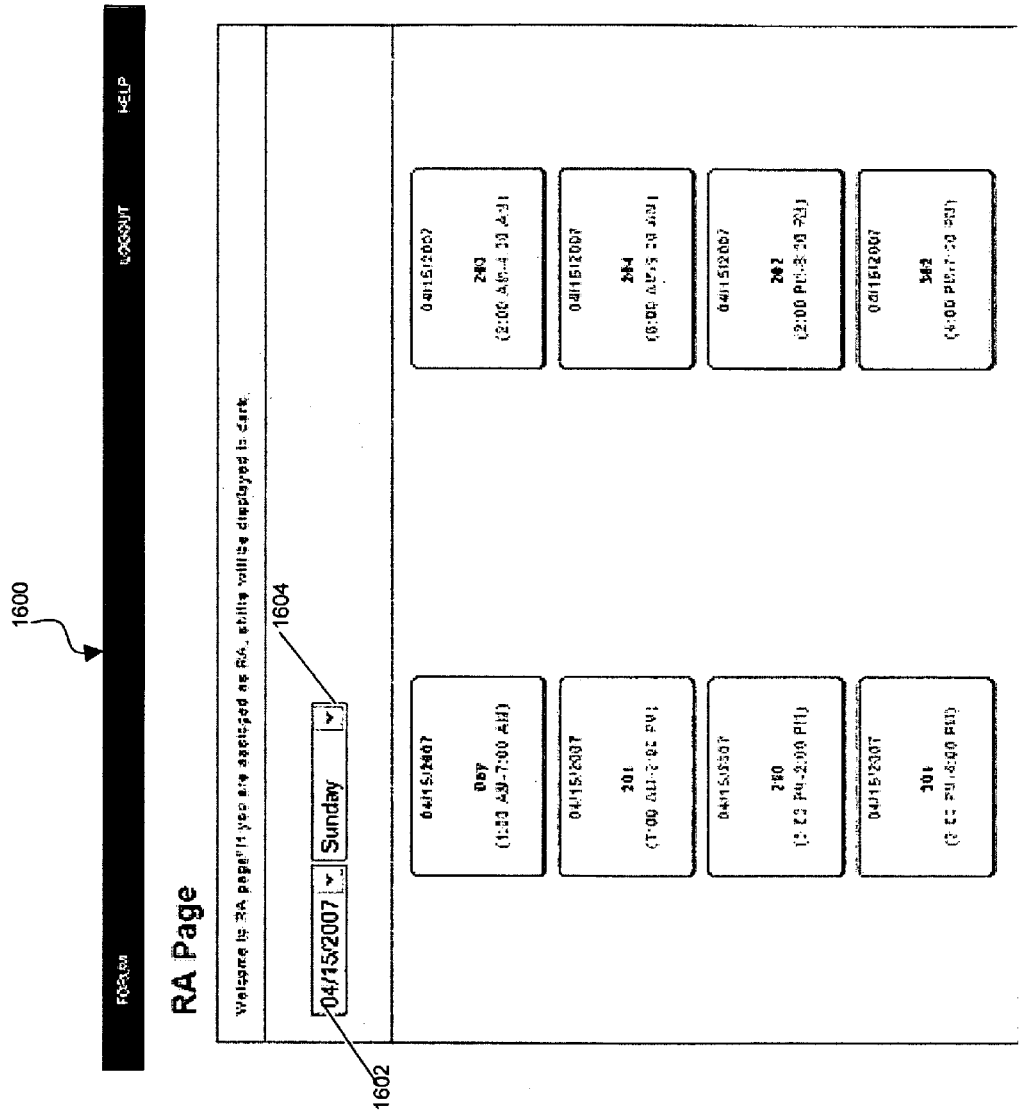
Figure 27B:
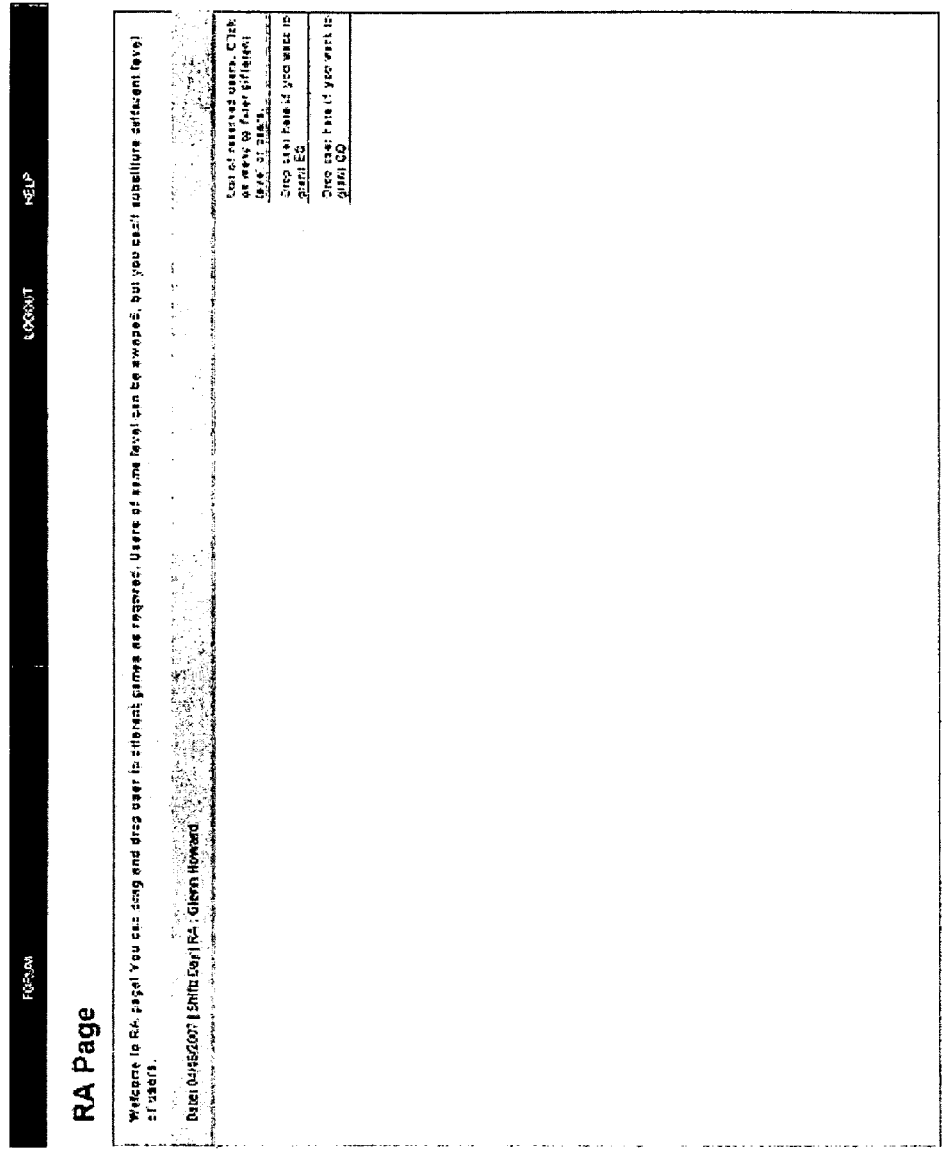
Figure 27C:
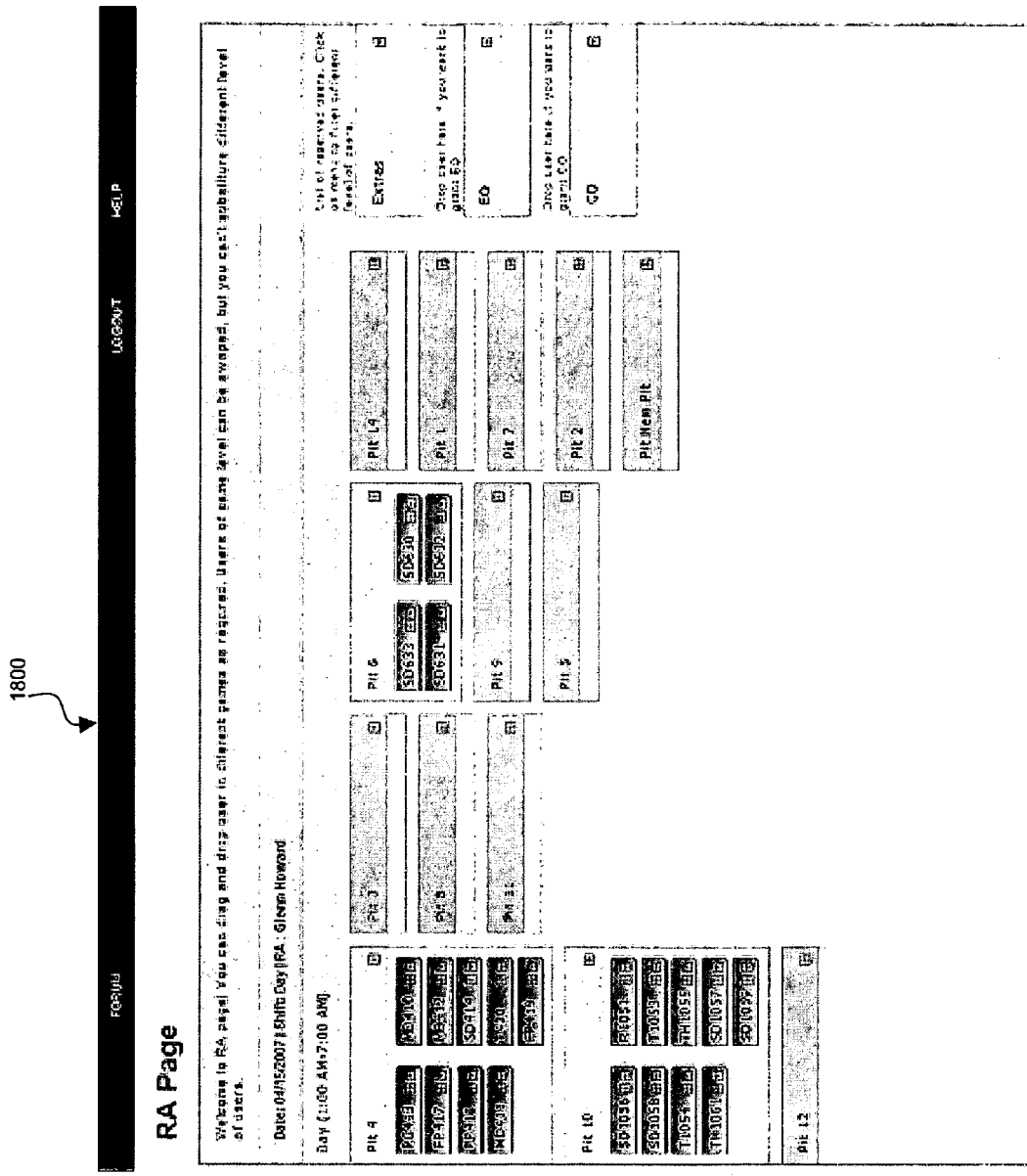
Figure 27D:
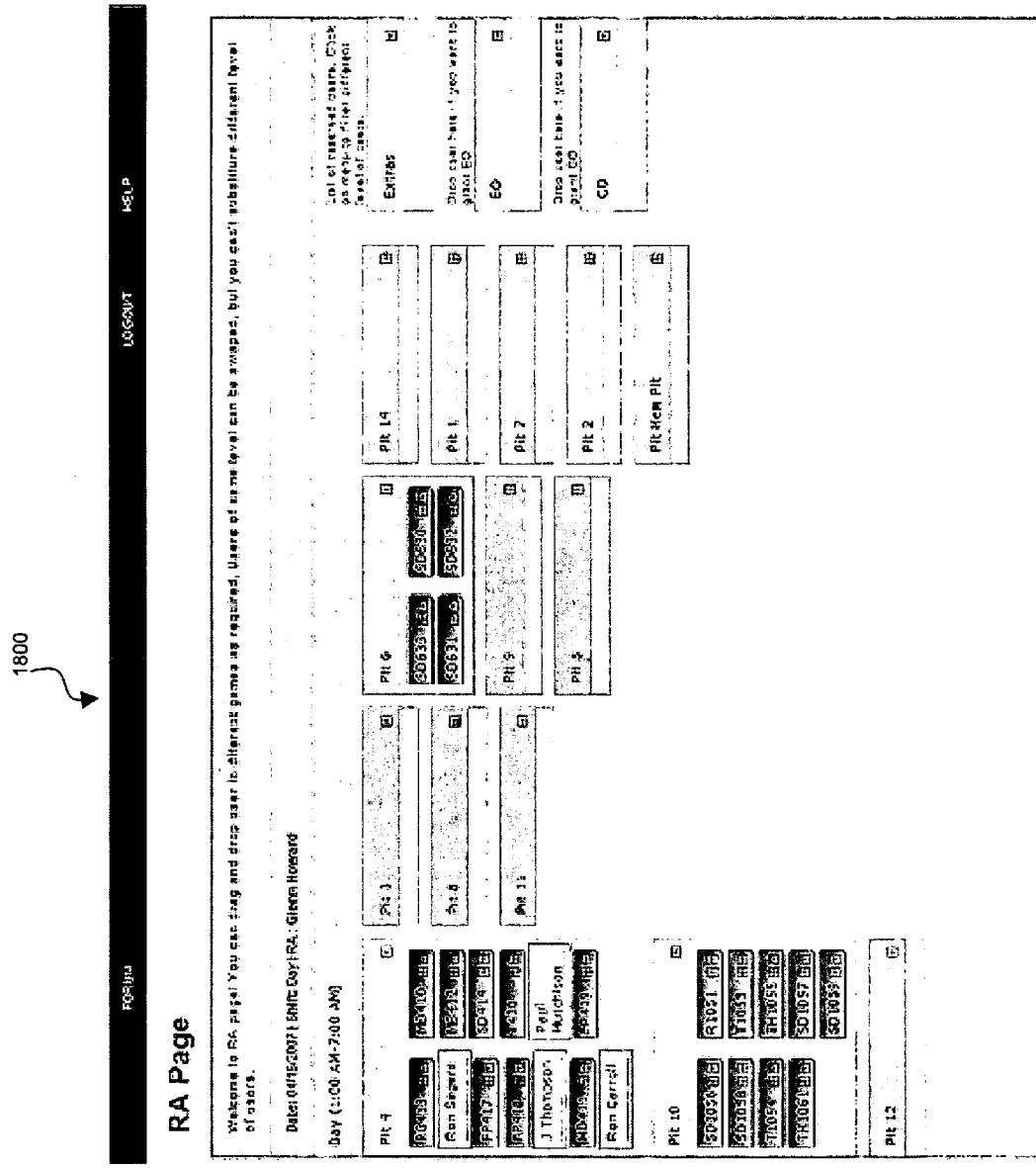
Figure 27E:
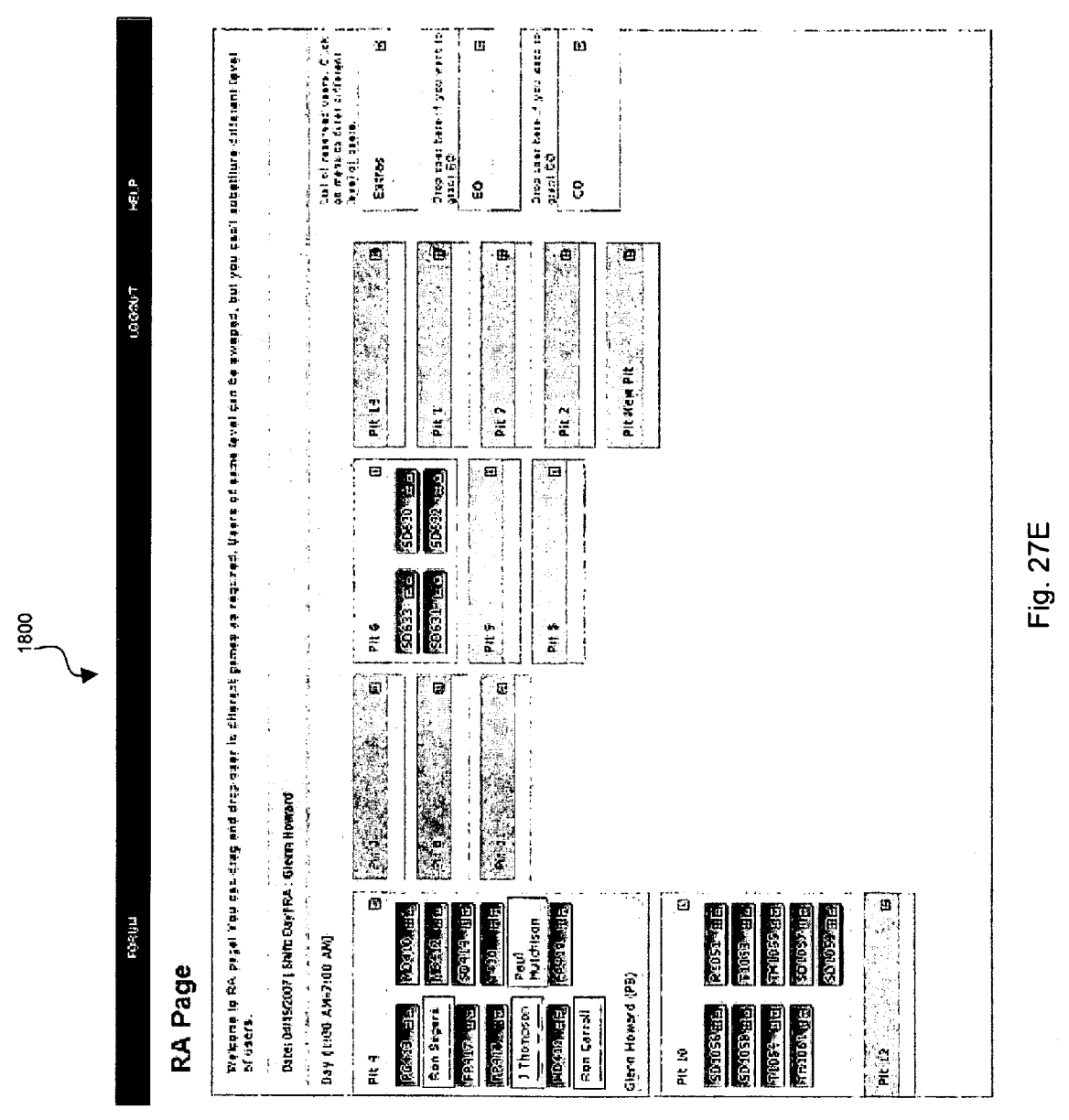
Figure 27F:
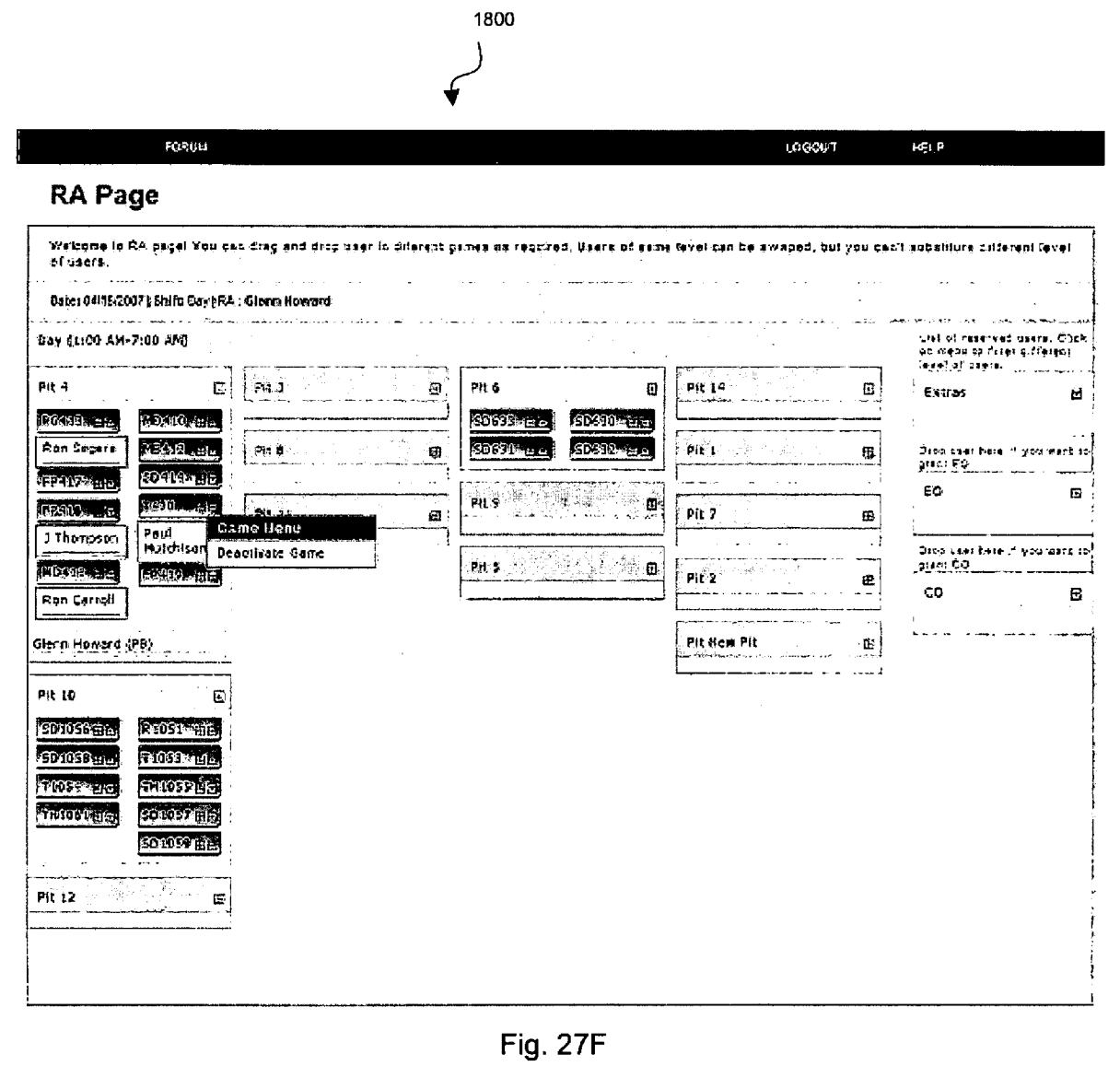
Figure 27G:
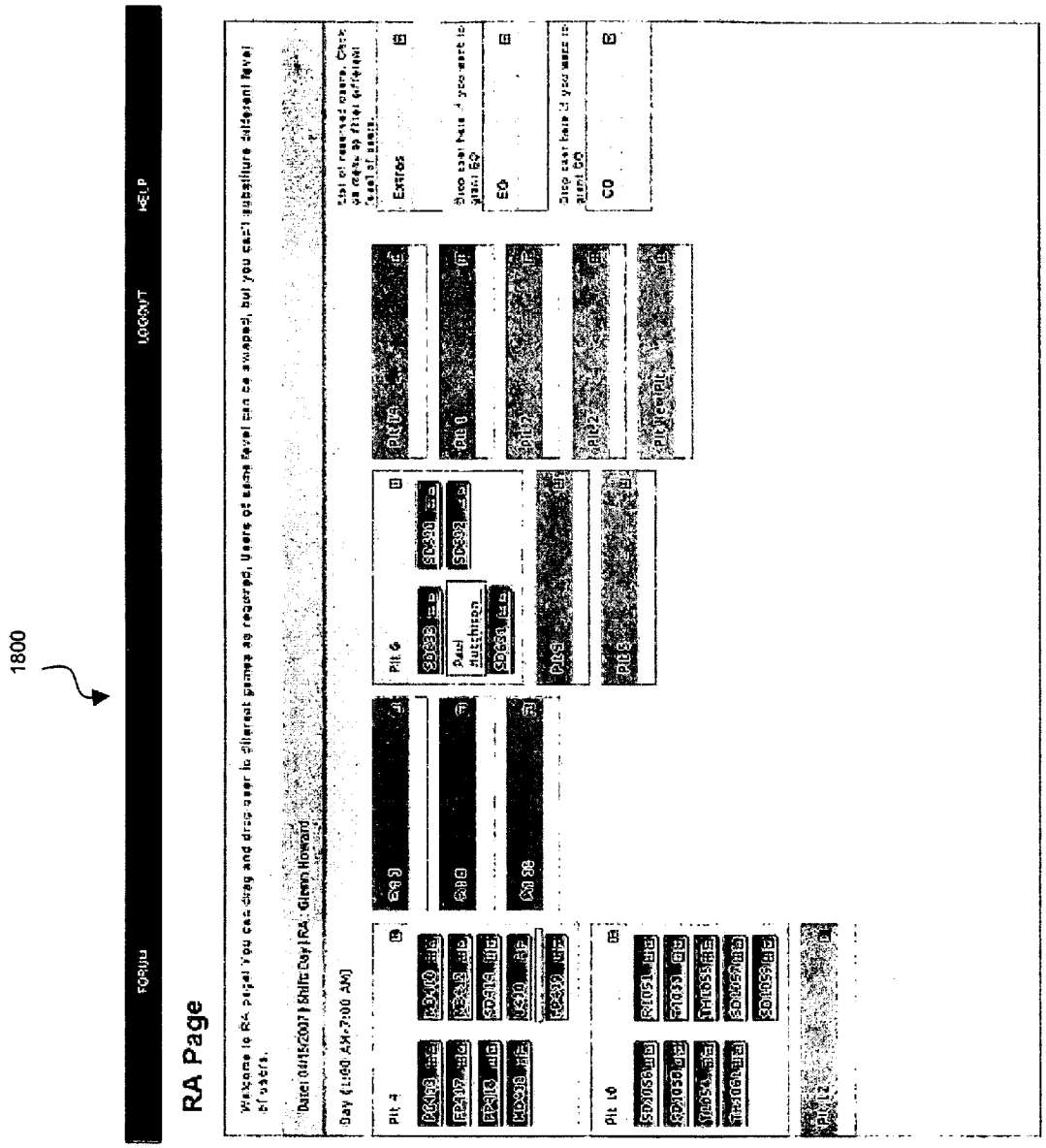
Figure 27H:
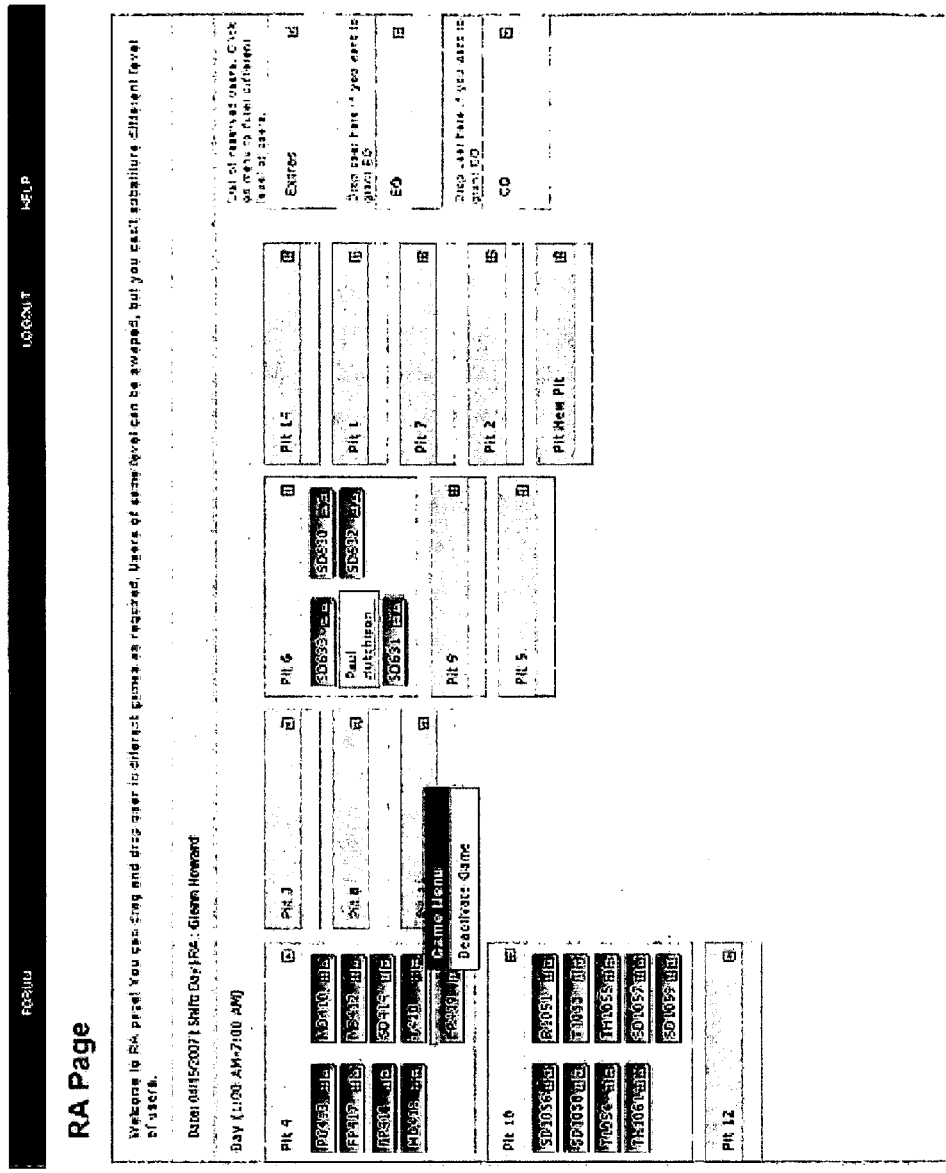
Figure 27I:
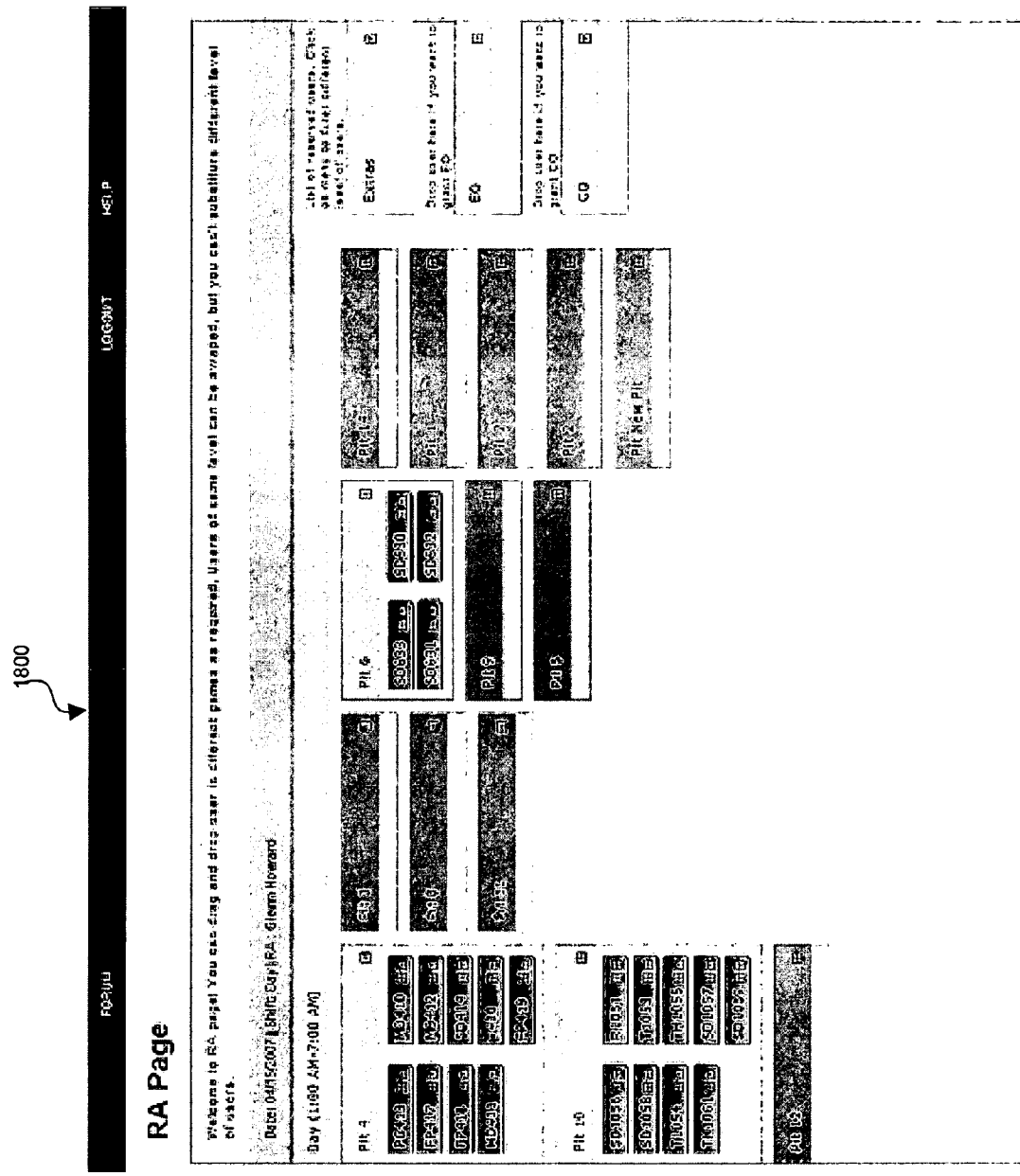
Figure 27J:
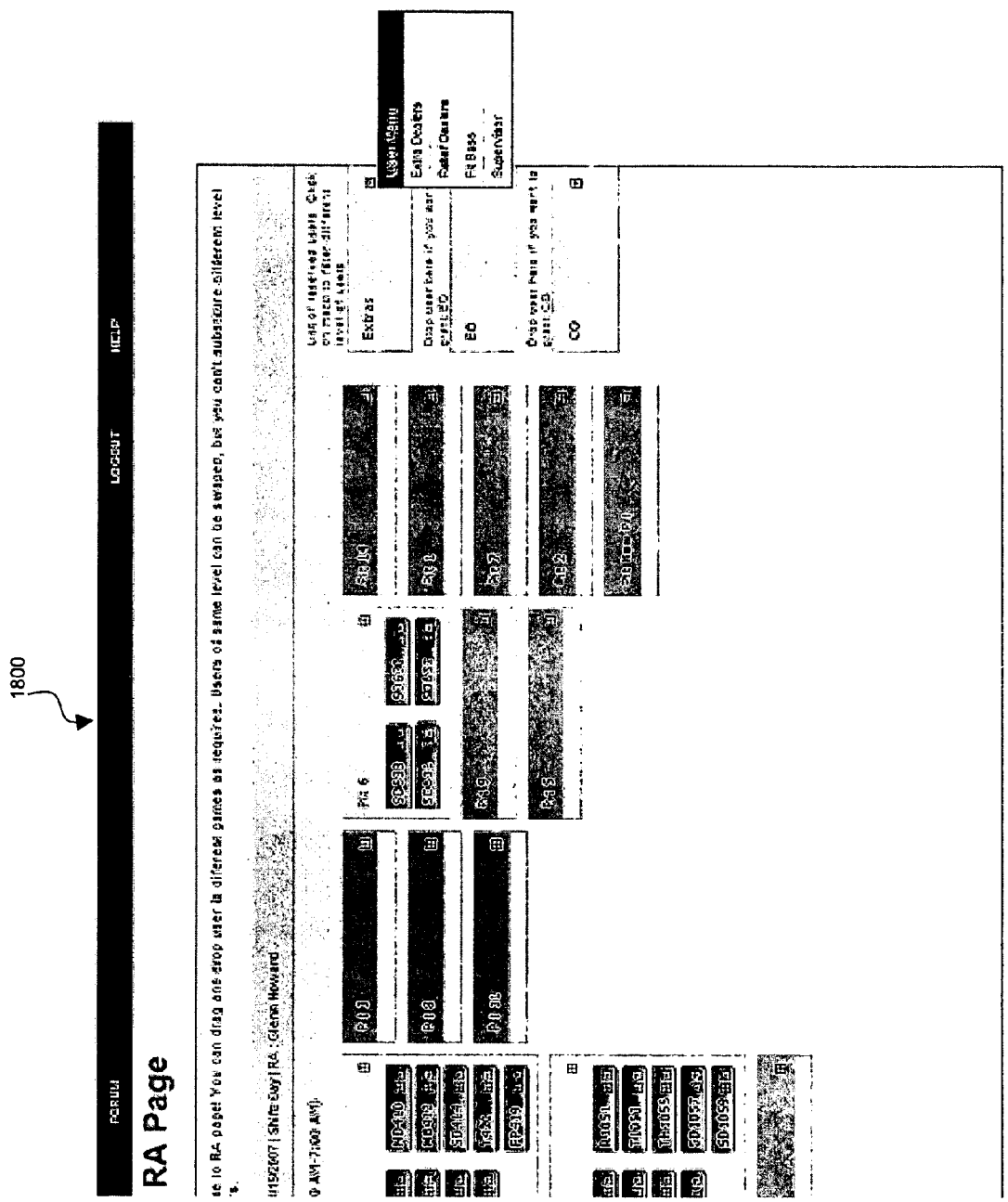

FIGS. 27A-27J illustrate example RA display screens that are provided for users to add, edit and view shifts, game assignments, game activations/deactivations, table assignments, dealer assignments, dealer substitutions or the like. FIG. 27A illustrates example display screen 1600, which shows an overview for the first day of the current week. The user can select drop down list 1602 to select a different week, or option 1604 to change the day. FIG. 27B illustrates example display screen 1700, which displays information for a respective RA.

FIGS. 27C-27J illustrate an example display screen 1800 for use by a RA to substitute employees, open and close games, open and close pits, grant early outs and call outs to respective employees, and to assign employees to respective games. For example, using the graphical screen controls shown in display screen 1800, users can use a mouse or other selection device to drag and drop names of employees to respective pits. To preserve data integrity, safeguards preclude dealer(s) from being dropped into a pit boss area, and pit bosses cannot be dropped into dealer area. Further, pit bosses and supervisors can be easily removed by selecting and dragging names from a respective game and placed into an employee area.

Other features and benefits of the teachings herein are provided. For communication among pit bosses or other parties can be done via a messaging interface, such as in a message forum, and available for users to post messages discreetly. Using a message forum, RAs or other parties can securely log into a message forum, type, review, reply to, and delete messages. Further, employees can securely log into an employee data entry display screens and make data selections, for example, to request early outs or call outs, or perform other data-related tasks. Since the interface is preferably provided in an internet, web-based environment, employees can access employee data entry display screens while away from work to quickly communicate with appropriate personnel.

Thus, as shown and described herein, the systems and methods shown and described herein provide a convenient, web-based application that allows scheduling and managing space and personnel in an establishment, such as a gaming institution, that is subject to change, sometimes rapidly, over time. Using the Internet allows employees to check their work schedules from different places as it allows managers to be mobile, as well. Moreover, the present invention helps the management make employment-related decisions as a function of employee evaluations.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A system for managing personnel and resources in a gaming establishment, the system comprising:
an information processor programmed and configured to communicate over a communication network;
at least one database accessible by the information processor and configured to store electronic information;
a user interface provided by the information processor and operable on a plurality of computing devices, wherein the user interface is programmed and configured to:
a1) display, on a computing device operated by a user, a representation of all active and inactive games, and all active and inactive pits, within the gaming establishment;
a2) identify, for each respective game represented via the user interface, a respective game class, game type, pit and employee assigned to the game;
b1) provide, on the computing device operated by the user, a prompt for entering new game class information representing a new class of game in the gaming establishment;
b2) receive, from the computing device operated by the user in response to the prompt for entering new game class information, the new game class information representing the new class of game;
b3) provide, on the computing device operated by the user, a prompt for modifying game class information representing a modified class of game;
b4) receive, from the computing device operated by the user in response to the prompt for modifying game class information, the modified game class information representing the modified class of game;
b5) provide, on the computing device operated by the user, a prompt for selecting a respective game class;
b6) receive, from the computing device operated by the user in response to the prompt for selecting a respective game class, a selection of a respective game class;
c1) provide, on the computing device operated by the user, a prompt for entering new game type information representing a new type of game;
c2) receive, from the computing device operated by the user in response to the prompt for entering new game type information, the new game type information representing the new type of game;
c3) provide, on the computing device operated by the user, a prompt for modifying game type information representing a modified type of game;
c4) receive, from the computing device operated by the user in response to the prompt for modifying game type information, the modified game type information representing the modified type of game;

c5) provide, on the computing device operated by the user, a prompt for selecting a respective game type;
c6) receive, from the computing device operated by the user in response to the prompt for selecting a respective game type, a selection of a respective game type;
d1) provide, on the computing device operated by the user, a prompt for activating a pit in a gaming establishment;
d2) receive, from the computing device operated by the user in response to the prompt for activating the pit, an activate pit command for activating the pit in the gaming establishment;
d3) provide, on the computing device operated by the user, a prompt for deactivating a pit in the gaming establishment;
d4) receive, from the computing device operated by the user in response to the prompt for deactivating the pit, a deactivate pit command for deactivating the pit in the gaming establishment;
e1) provide, on the computing device operated by the user, a prompt for activating a game in a pit in the gaming establishment;
e2) receive, from the computing device operated by the user in response to the prompt for activating the game, an activate game command for activating the game in the pit;
e3) provide, on the computing device operated by the user, a prompt for deactivating a game in a pit in the gaming establishment;
e4) receive, from the computing device operated by the user in response to the prompt for deactivating the game, a deactivate game command for deactivating the game in the pit;
f1) provide, on the computing device operated by the user, a prompt for assigning an employee to a game in the gaming establishment;
f2) receive, from the computing device operated by the user in response to the prompt for assigning an employee to a game, an assign employee command for assigning the employee to the game;
f3) provide, on the computing device operated by the user, a prompt for removing an employee from a game in the gaming establishment; and
f4) receive, from the computing device operated by the user in response to the prompt for removing the employee from the game, a remove employee command for removing the employee from the game.

2. The system of claim 1, wherein the user interface is further programmed and configured to:
g1) provide, on the computing device operated by the user, a prompt for entering a call out and an early out;
g2) receive, from the computing device operated by the user in response to the prompt for entering the call out and the early out, a call out or an early out command for the call out or the early out, respectively; and
further wherein the information processor is programmed and configured to assign an employee to a shift or reassign a different employee to the shift as a function of the early out command or the call out command.

3. The system of claim 1, wherein the user interface is further programmed and configured to:
g1) provide, on the computing device operated by the user, a prompt for rearranging at least one of a table and a pit in the gaming establishment; and
g2) receive, from the computing device operated by the user in response to the prompt for rearranging, a rearrange command for rearranging at least one of the table and the pit in the gaming establishment.

4. The system of claim 3, wherein the rearrange command is received via drag-and-drop functionality.

5. The system of claim 1, wherein the user interface is further programmed and configured to:
g1) provide, on the computing device operated by the user, a prompt for assigning a schedule for at least one employee to one or more of a table and a pit in the gaming establishment; and
g2) receive, from the computing device operated by the user in response to the prompt for automatically assigning the schedule, a scheduling command,
wherein the information processor is further programmed and configured to assign the schedule for the at least one employee to the one or more of the table and a pit in the gaming establishment in response to scheduling command.

6. The system of claim 1, wherein the user interface is further programmed and configured to provide, on the computing device operated by the user, employee information from the at least one database in association with at least one game.

7. The system of claim 6, wherein the employee information includes an amount of time that the employee has been assigned to at least one of a respective table and a respective game.

8. The system of claim 1, wherein the user interface is further programmed and configured to:
g1) provide, on the computing device operated by the user, a prompt for automatically assigning a schedule for at least one employee to one or more of table and a pit in the gaming establishment over a period of time; and
g2) receive, from the computing device operated by the user in response to the prompt for automatically assigning the schedule, a scheduling command,
wherein the information processor automatically assigns the schedule for the at least one employee to the one or more of the table and the pit in the gaming establishment over the period of time in response to the scheduling command.

9. The system of claim 8, wherein the at least one employee is a plurality of employees.

10. The system of claim 1, wherein the user interface is further programmed and configured to:
g1) provide, on the computing device operated by the user, a prompt for entering employee information for at least one employee of the gaming establishment; and
g2) receive, from the computing device operated by the user in response to the prompt for automatically entering employee information, employee information representing the employee's availability to work and respective proficiencies in a plurality of games.

11. A method for managing personnel and resources in a gaming establishment, the method comprising:
configuring an information processor to communicate over a communication network;
maintaining at least one database storing electronic information that is accessible by the information processor;
displaying, via a user interface on a computing device operated by a user, a representation of all active and inactive games, and all active and inactive pits, within the gaming establishment;
identifying, via the user interface on the computing device operated by the user and for each respective game represented via the user interface, the respective game class, game type, pit and employee assigned to the game;

providing via the user interface on the computing device operated by the user, a prompt for entering new game class information representing a new class of game;

receiving, via the user interface from the computing device operated by the user in response to the prompt for entering new game class information, the new game class information representing the new class of game;

providing, via the user interface on the computing device operated by the user, a prompt for modifying game class information representing a modified class of game;

receiving, via the user interface from the computing device operated by the user in response to the prompt for modifying game class information, the modified game class information representing the modified class of game;

providing, via the user interface on the computing device operated by the user, a prompt for selecting a respective game class;

receiving, via the user interface from the computing device operated by the user in response to the prompt for selecting a respective game class, a selection of a respective game class;

providing, via the user interface on the computing device operated by the user, a prompt for entering new game type information representing a new type of game;

receiving, via the user interface from the computing device operated by the user in response to the prompt for entering new game type information, the new game type information representing the new type of game;

providing, via the user interface on the computing device operated by the user, a prompt for modifying game type information representing the modified type of game;

receiving, via the user interface from the computing device operated by the user in response to the prompt for modifying game type information, the modified game type information representing a modified type of game;

providing, via the user interface on the computing device operated by the user, a prompt for selecting a respective game type;

receiving, via the user interface from the computing device operated by the user in response to the prompt for selecting a respective game type, a selection of a respective game type;

providing, via the user interface on the computing device operated by the user, a prompt for activating a pit in a gaming establishment;

receiving, via the user interface from the computing device operated by the user in response to the prompt for activating the pit, an activate pit command for activating the pit in the gaming establishment;

providing, via the user interface on the computing device operated by the user, a prompt for deactivating a pit in the gaming establishment;

receiving, via the user interface from the computing device operated by the user in response to the prompt for deactivating the pit, a deactivate pit command for deactivating the pit in the gaming establishment;

providing, via the user interface on the computing device operated by the user, a prompt for activating a game in a pit in the gaming establishment;

receiving, via the user interface from the computing device operated by the user in response to the prompt for activating the game, an activate game command for activating the game in the pit;

providing, via the user interface on the computing device operated by the user, a prompt for deactivating a game in a pit in the gaming establishment;

receiving, via the user interface from the computing device operated by the user in response to the prompt for deactivating the game, a deactivate game command for deactivating the game in the pit;

providing, via the user interface on the computing device operated by the user, a prompt for assigning an employee to a game in the gaming establishment;

receiving, via the user interface from the computing device operated by the user in response to the prompt for assigning an employee to a game, an assign employee command for assigning the employee to the game;

providing, via the user interface on the computing device operated by the user, a prompt for removing an employee from a game in the gaming establishment; and receiving, via the user interface from the computing device operated by the user in response to the prompt for removing the employee from the game, a remove employee command for removing the employee from the game.

12. The method of claim 11, further comprising:

providing, via the user interface on the computing device operated by the user, a prompt for entering a call out and an early out;

receiving, via the user interface from the computing device operated by the user in response to the prompt for entering the call out and the early out, a call out or an early out command for the call out or the early out, respectively; and assigning an employee to a shift or reassign a different employee to the shift as a function of the early out command or the call out command.

13. The method of claim 11, further comprising:

providing, via the user interface on the computing device operated by the user, a prompt for rearranging at least one of a table and a pit in the gaming establishment; and receiving, via the user interface from the computing device operated by the user in response to the prompt for rearranging, a rearrange command for rearranging at least one of the table and the pit in the gaming establishment.

14. The method of claim 13, wherein the rearrange command is received via drag-and-drop functionality.

15. The method of claim 11, further comprising:

providing, via the user interface on the computing device operated by the user, a prompt for assigning a schedule for at least one employee to one or more of a table and a pit in the gaming establishment;

receiving, via the user interface from the computing device operated by the user in response to the prompt for automatically assigning a schedule, a scheduling command; and assigning the schedule for the at least one employee to the one or more of the table and the pit in the gaming establishment in response to the scheduling command.

16. The method of claim 11, further comprising providing, via the user interface on the computing device operated by the user, employee information from the at least one database in association with at least one game.

17. The method of claim 16, wherein the employee information includes an amount of time that the employee has been assigned to at least one of a respective table and a respective game.

18. The method of claim 11, further comprising to:

providing, via the user interface on the computing device operated by the user, a prompt for automatically assigning a schedule for at least one employee to one or more of table and a pit in the gaming establishment over a period of time; and receiving, via the user interface from the computing device operated by the user in response to the prompt for automatically assigning the schedule, a scheduling command, wherein the information processor automatically assigns the schedule for the at least one employee to the one or more of the table and the pit in the gaming establishment over the period of time in response to scheduling command.

19. The method of claim 18, wherein the at least one employee is a plurality of employees.

20. The method of claim 11, further comprising:

providing, via the user interface on the computing device operated by the user, a prompt for entering employee information for at least one employee of the gaming establishment; and receiving, via the user interface from the computing device operated by the user in response to the prompt for automatically entering employee information, employee information representing the employee's availability to work and respective proficiencies in a plurality of games.

* * * * *